United States Patent
Bhattacharjee et al.

(10) Patent No.: US 8,548,981 B1
(45) Date of Patent: Oct. 1, 2013

(54) PROVIDING RELEVANCE- AND DIVERSITY-INFLUENCED ADVERTISEMENTS INCLUDING FILTERING

(75) Inventors: Rajat Bhattacharjee, Mountain View, CA (US); Aranyak Mehta, Mountain View, CA (US); Benyu Zhang, Fremont, CA (US); Vivek Raghunathan, Fremont, CA (US)

(73) Assignee: Google Inc., Mountain View, CA (US)

( * ) Notice: Subject to any disclaimer, the term of this patent is extended or adjusted under 35 U.S.C. 154(b) by 61 days.

(21) Appl. No.: 12/979,688

(22) Filed: Dec. 28, 2010

Related U.S. Application Data

(60) Provisional application No. 61/357,939, filed on Jun. 23, 2010.

(51) Int. Cl.
*G06F 17/30* (2006.01)

(52) U.S. Cl.
USPC ........... 707/713; 707/706; 707/722; 707/737; 707/758; 707/781

(58) Field of Classification Search
USPC ................. 707/706, 713, 722, 737, 758, 781, 707/999.001–999.005
See application file for complete search history.

(56) References Cited

U.S. PATENT DOCUMENTS

| | | | |
|---|---|---|---|
| 7,617,205 B2 | 11/2009 | Bailey et al. | |
| 2006/0224554 A1* | 10/2006 | Bailey et al. | 707/1 |
| 2007/0266002 A1* | 11/2007 | Chowdhury et al. | 707/2 |
| 2009/0094200 A1* | 4/2009 | Baeza-Yates et al. | 707/3 |
| 2010/0179948 A1* | 7/2010 | Xie et al. | 707/706 |
| 2010/0299343 A1* | 11/2010 | Ahari et al. | 707/759 |

* cited by examiner

*Primary Examiner* — Syling Yen
(74) *Attorney, Agent, or Firm* — Fish & Richardson P.C.

(57) ABSTRACT

Methods, including computer programs encoded on a computer storage medium, for enhancing selecting of relevant and diverse advertisements by selecting additional queries relating to an initial query, and by filtering additional queries and their associated advertisements.

4 Claims, 16 Drawing Sheets

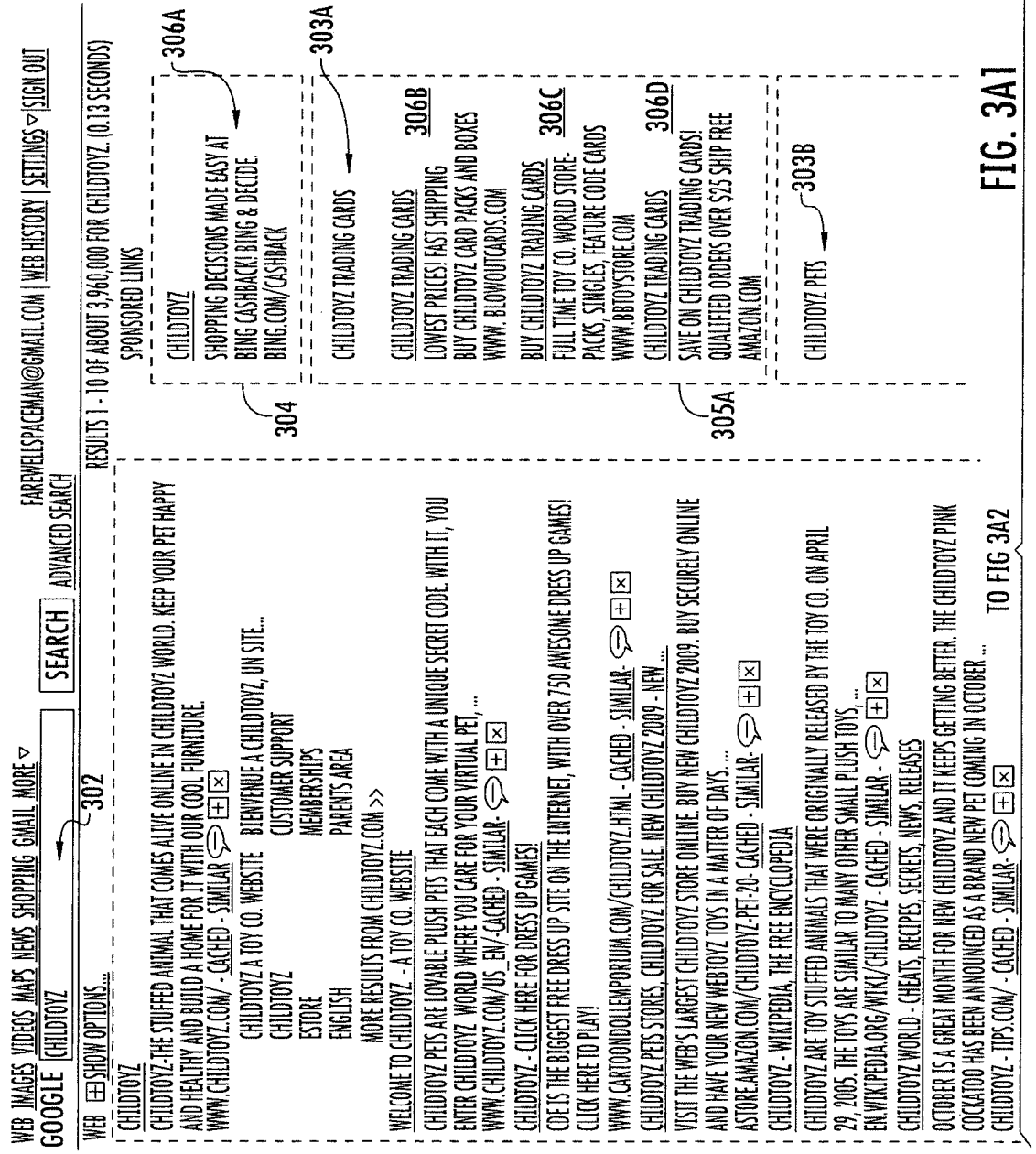
FIG. 3A1

FIG. 3A2

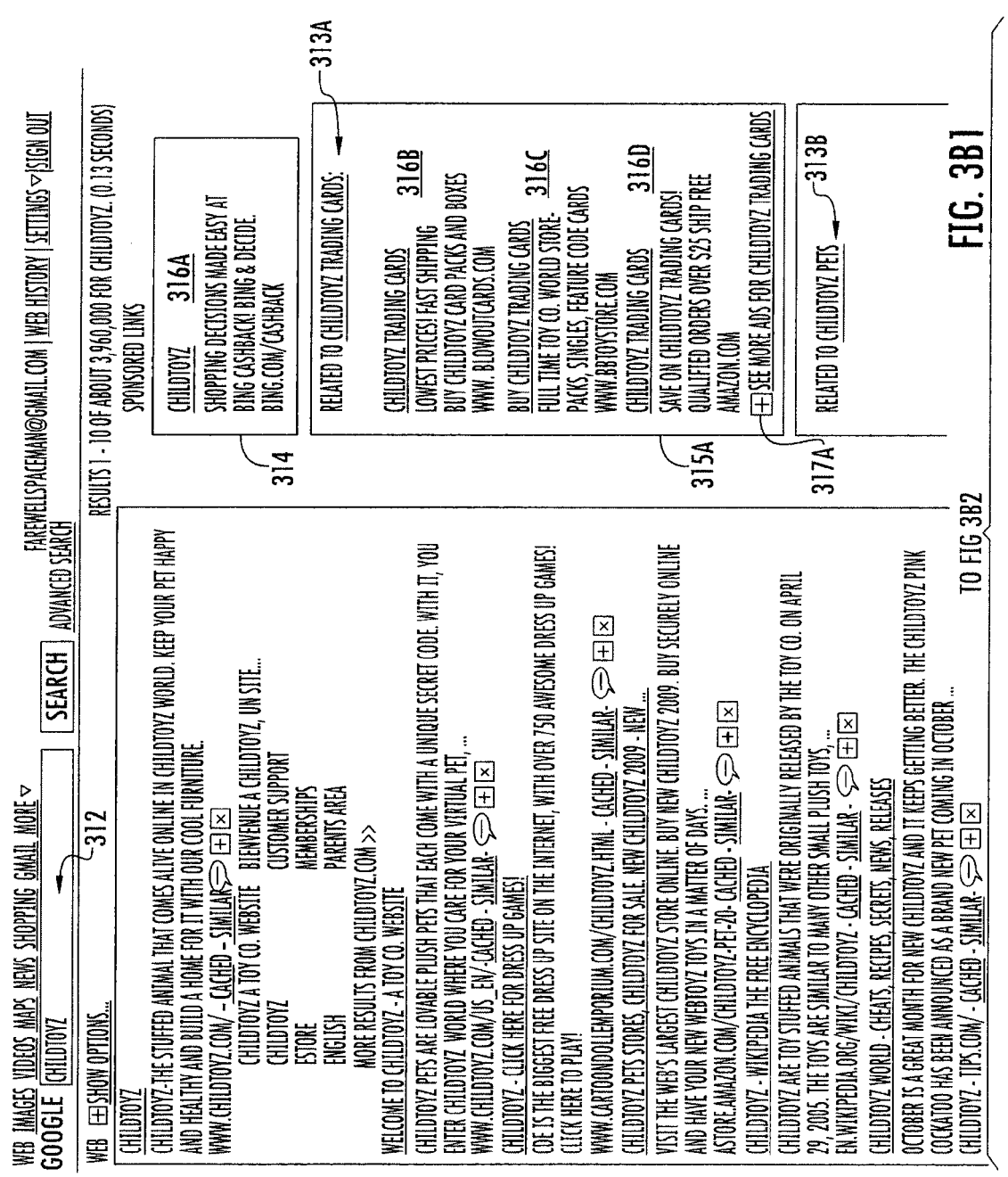
FIG. 3B1

FIG. 3B2

FROM FIG 3B1

CHILDTOYZ JR.
WHAT IS CHILDTOYZ JR.? CHILDTOYZ JR. PETS ARE LOVABLE PLUSH ANIMALS THAT EACH COME WITH A
UNIQUE PET CODE. WELCOME TO CHILDTOYZ JR. HOME. - NEW MEMBER...
WWW.CHILDTOYZJR.COM / - CACHED - SIMILAR - 🔍 ⊞ ☒

CHILDTOYZ INSIDER -- CHILDTOYZ NEWS, INFO, RECIPES & FORUMS!
SEP 11, 2009 ... FREE CHILDTOYZ, SECRET RECIPES, CHAT FORUM, NEWS, TIPS AND TRICKS AND GAME
STRATEGIES FOR CHILDTOYZ WORLD.
WWW.CHILDTOYZINSIDER.COM/ - 54 MINUTES AGO - CACHED - SIMILAR - 🔍 ⊞ ☒

AMAZON.COM: CHILDTOYZ: TOYS & GAMES
BESTSELLERS IN CHILDTOYZ. CHILDTOYZ BROWN SPRINGER SPANIEL OUR PRICE: $6.70. CHILDTOYZ HM222
SILVERSOFT CAT PLUSH ANIMAL, OUR PRICE: $6.20. CHILDTOYZ RACCOON ...
WWW.AMAZON.COM/CHILDTOYZ/B?IE=UTF8&NODE... - CACHED - SIMILAR - 🔍 ⊞ ☒

THE #1 WEBSITE FOR EVERYTHING ABOUT CHILDTOYZ
CHILDTOYZ HUB IS THE FUNNEST PLACE TO BE FOR NEWEST INFORMATION ON THE WORLD OF CHILDTOYZ AND
LIL TOYZ.
WWW.CHILDTOYZHUB.COM/ - CACHED - SIMILAR - 🔍 ⊞ ☒

NEWS RESULTS FOR CHILDTOYZ
  RESTAURANT TO OFFER EXCLUSIVE CHILDTOYZ PET - 1 DAY AGO
  OPOSSUM IS THE NEW ULTRA-SOFT PLUSH TOY FROM CHILDTOYZ AND WILL BE AVAILABLE ONLY AT
  RESTAURANT STARTING ON SEPTEMBER 11TH. "IT IS A TREMENDOUS HONOR TO ...
  PR-USA.NET (PRESS RELEASE) - 25 RELATED ARTICLES»

SEARCHES RELATED TO: CHILDTOYZ
CHILDTOYZ CHEATS    FUTURE CHILDTOYZ    CHILDTOYZ CODES    CHILDTOY.COM TOY CO. WEBSITE
CHILDTOYZ RECIPES   CHILDTOYZ LOGIN     CHILDTOYZ CLUB     CHILDTOYZ 2008

GOOOOOOOOOGLE
1 2 3 4 5 6 7 8 9 10
△ NEXT

⊞ ADD A RESULT - SEE ALL MY SEARCHWIKI NOTES - SEE ALL NOTES FOR THIS SEARCHWIKI - LEARN MORE

WE SELL CHILDTOYZ PETS HERE  316E
FULL TIME TOY CO. CHILDTOYZ WORLD STORE
- ALL NEW PLUSH, CHARMS, CARDS & MORE
WWW.BBTOYSTORE.COM

CHILDTOYZ PETS  316F
FIND CHILDTOYZ PETS
AT WEBCRAWLER.COM
WWW.WEBCRAWLER.COM

⊞ SEE MORE ADS FOR CHILDTOYZ TRADING PETS

RELATED TO CHILDTOYZ CHARMS: ← 313C

CHILDTOYZ CHARMS
BID ON CHILDTOYZ CHARMS NOW!
FIND STUFFED ANIMALS.  316G
WWW.EBAY.COM

CHILDTOYZ CHARMS  316H
10,000+ CHILDTOYZ CHARMS
SHOP, COMPARE AND SAVE AT PRONTO.
CHARM.PRONTO.COM

⊞ SEE MORE ADS FOR CHILDTOYZ CHARMS.

315B
311
317B
315C
317C
310

[CHILDTOYZ]  [SEARCH]

SEARCH WITHIN RESULTS - LANGUAGE TOOLS - SEARCH HELP - DISSATISFIED? HELP US IMPROVE - TRY GOOGLE EXPERIMENTAL
GOOGLE HOME - ADVERTISING PROGRAMS - BUSINESS SOLUTIONS - PRIVACY - ABOUT GOOGLE

FIG. 3E

PROVIDING RELEVANCE- AND DIVERSITY-INFLUENCED ADVERTISEMENTS INCLUDING FILTERING

CROSS-REFERENCE TO RELATED APPLICATION

This application claims priority to U.S. Provisional Application No. 61/357,939, filed on Jun. 23, 2010. The disclosure of the prior application is considered part of and is incorporated by reference in the disclosure of this application.

BACKGROUND

This specification generally relates to content presentation.

A search engine results page provides a user of a search engine with a list of search results that the search engine identifies in response to a search query. Search engine results pages may include advertisements that are relevant to the search query. Advertisements, which are also referred to as "sponsored listings," are typically displayed on the right hand side of a search engine results page or directly above the search results, although other locations are possible.

The user, the search engine provider, and the advertiser may all benefit when the user selects or otherwise interacts with an advertisement that is displayed on the search engine results page. When the search engine results page includes advertisements that are not interesting to the user, the user may become annoyed and quickly navigate away without selecting or interacting with an advertisement. As a result, the opportunity for the user, the search engine provider, and the advertiser to benefit may be reduced.

In order to increase the quality of search results provided to the user, search engines may provide suggestions that are likely to be relevant to the initial query, and thus likely to be of interest to the search engine user. The user may be more interested in one or more of the suggestions than the initial query for various reasons.

Search engines may also use suggestions to maximize exposure to relevant targeted advertisements. Search engines may display advertisements relevant to the suggestions in addition to advertisements relevant to the initial query.

However, in some cases suggestions and associated advertisements turn out to be of no interest to the user. This can occur due to various factors, such as because one or more terms being used in a context different than the user had in mind. Such cases represent squandered opportunities for providing targeted advertisements to users.

SUMMARY

The present disclosure relates to methods for filtering out candidate additional queries and their associated advertisements.

In general, one aspect of the subject matter described in this specification can be embodied in methods that include the actions of receiving an initial query including one or more terms; selecting one or more additional queries relating to the initial query; identifying one or more content items targeted to the initial query, and one or more content items for each additional query, the one or more content items for an additional query forming a content block; for an additional query, determining anonymized behavioral feedback associated with the additional query and the content block; and providing one or more additional queries and an associated content block if the content block satisfies a threshold associated with the anonymized behavioral feedback.

In general, another aspect of the subject matter described in this specification can be embodied in methods that include the actions of receiving an initial query including one or more terms; selecting one or more contextually relevant additional queries relating to the initial query; identifying one or more content items targeted to the initial query, and one or more content items for each of the contextually relevant additional query, the one or more content items for a contextually relevant additional query forming a content block; for a content block, determining one or more indicators of anonymized historical performance for the content block; and providing a content block and associated contextually relevant additional query along with search results associated with the initial query if the content block satisfies a threshold associated with the anonymized historical performance.

In general, another aspect of the subject matter described in this specification can be embodied in methods that include the actions of receiving an initial query; selecting one or more relevant additional queries relating to the initial query; identifying one or more content items for each of the relevant additional queries, the one or more content items forming a content block; for at least one content block, determining one or more filter criteria; and providing a content block and associated relevant additional query along with search results associated with the initial query if the content block satisfies the criteria.

In general, another aspect of the subject matter described in this specification can be embodied in methods that include the actions of selecting one or more relevant additional queries relating to an instance of an initial query; determining an anonymized historical performance of user interaction with one or more content items that have been presented with each of the relevant additional queries; determining one or more filter criteria associated with the anonymized historical performance and filter out one or more relevant additional queries from consideration for presentation at a next receipt of the initial query; receiving a second instance of the initial query; and providing one or more relevant additional queries that satisfy the filter criteria, one or more content items associated with the relevant additional queries along with search results associated with the second instance of the initial query.

In general, another aspect of the subject matter described in this specification can be embodied in methods that include the actions of determining an anonymized historical performance of user interaction with one or more relevant additional queries associated with an instance of an initial query; determining one or more filter criteria associated with the anonymized historical performance and filter out one or more relevant additional queries from consideration for presentation at a next receipt of the initial query; receiving a second instance of the initial query; and providing one or more relevant additional queries that satisfy the filter criteria, one or more content items associated with the relevant additional queries along with search results associated with the second instance of the initial query.

In general, another aspect of the subject matter described in this specification can be embodied in methods that include the actions of determining one or more signals associated with each of one or more relevant additional queries that themselves are associated with an instance of an initial query; determining one or more filter criteria associated with the signals and filter out one or more relevant additional queries from consideration for presentation at the receipt of another query; receiving a second query; and providing one or more relevant additional queries that satisfy the filter criteria, one or more content items associated with the relevant additional queries along with search results associated with the second instance of the initial query.

Other embodiments of these aspects include corresponding systems, apparatus, and computer program products.

As used by this specification, a "search query" (also including, for example, a "voice query" when spoken instead of initially input as text) includes one or more query terms that a user submits to a search engine when the user requests the search engine to execute a search for information, where a "term" or a "query term" includes one or more whole or partial words, characters, or strings of characters. Among other things, a "result" (or a "search result") of the search query includes a Uniform Resource Identifier (URI) that references a resource that the search engine determines to be responsive to the search query. The search result may include other things, such as a title, preview image, user rating, map or directions, description of the corresponding resource, or a snippet of text that has been automatically or manually extracted from, or otherwise associated with, the corresponding resource.

Particular embodiments of the subject matter described in this specification may be implemented to realize none, one or more of the following advantages. Users may be more likely to view only those advertisements that are likely to be of interest to them. Fewer squandered advertising opportunities may result. The advertiser may increase their sales opportunities, and the search engine provider may receive additional revenue, as more users select the advertiser's advertisements. The advantages and features can be separately realized or realized in various combinations.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF DRAWINGS

FIGS. 3A1 to 3E show example search engine results pages.

Like reference symbols in the various drawings indicate like elements.

DETAILED DESCRIPTION

Briefly, a system selects and provides one or more content items (e.g., advertisements or "ads") that are relevant to a user of the system. Reference will be made in the following materials to providing ads, however other forms of content items can be provided. In some implementations, to accomplish this, an ad selector engine may select candidate advertisements that are targeted to an initial query that the user has submitted, as well as candidate advertisements that are targeted to one or more additional queries that are automatically derived from the initial query. An auction engine may dynamically perform a competition, i.e., an auction, among advertisers associated with candidate advertisements, to select one or more subsets of the candidate advertisements to include in an ad block.

Figure 1:
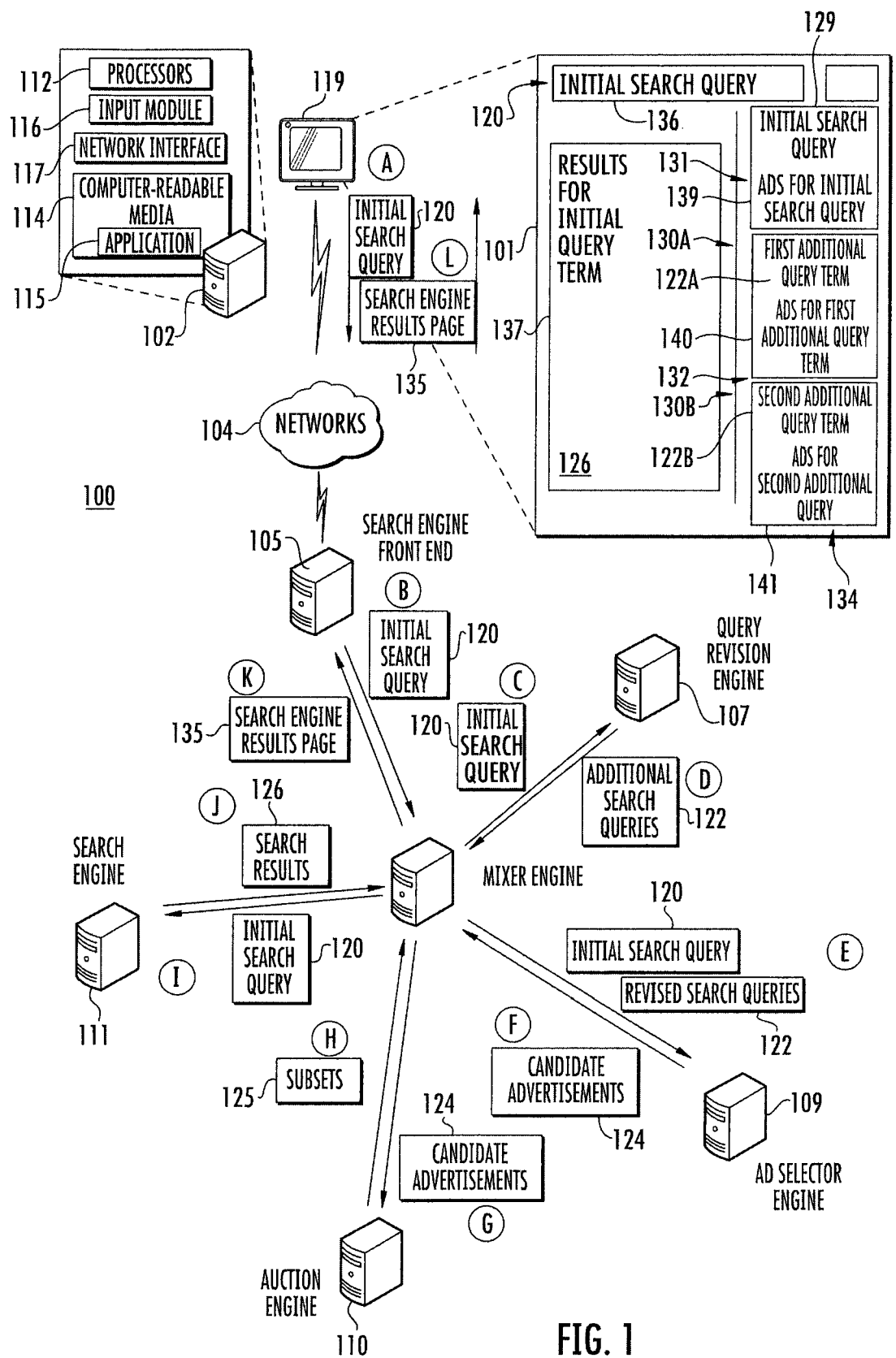
FIG. 1 is a diagram of an example system that can select content on a search engine results page.

FIG. 1 is a diagram of an example system 100 that can provide content items on a search engine results page 101. FIG. 1 also illustrates a flow of data within the system 100 during states (a) to (m), where the states (a) to (m) may occur in the illustrated sequence, or they may occur in a sequence that is different than is illustrated.

The search engine 111 returns search results that are used by a mixer engine 106 to assemble the search engine results page 101. Among other things, the search engine results page 101 references an initial query 120 (e.g., using reference 129) and additional queries 122 (e.g., using reference 130), and that includes advertisements 131 from a subset 125 that have been selected for the initial query and advertisements 132, 134 from the subset 125 that have been selected for the additional queries 122.

In more detail, the system 100 includes a client device 102 that communicates over one or more networks 104 with a search engine front end (or a "gateway server") 105, the mixer engine 106, the query reviser engine 107, the ad selector engine 109, the auction engine 110, the search engine 111, and, optionally, other engines. As used by this specification, an "engine" (or "software engine") refers to a software-implemented input/output system that provides an output that is different than the input. An engine may be an encoded block of functionality, such as a library, a platform, Software Development Kit ("SDK") or an object. The networks 104 may include, for example, a wireless cellular network, a wireless local area network (WLAN) or Wi-Fi network, a Third Generation (3G) or Fourth Generation (4G) mobile telecommunications network, a wired Ethernet network, a private network such as an intranet, a public network such as the Internet, or any appropriate combination thereof.

The client device 102, the search engine front end 105, the mixer engine 106, the query reviser engine 107, the ad selector engine 109, the auction engine 110, and the search engine 111 may each be implemented on any appropriate type of computing device (e.g., servers, mobile phones, tablet computers, music players, e-book readers, laptop or desktop computers, PDAs, smart phones, or other stationary or portable devices) that includes one or more processors and computer readable media. Among other components, the client device includes one or more processors 112, computer readable media 114 that store software applications 115 (e.g. a browser or layout engine), an input module 116 (e.g., a keyboard or mouse), communication interface 117, and a display 119. The computing device or devices that implement the search engine front end 105, the mixer engine 106, the query reviser engine 107, the ad selector engine 109, the auction engine 110, and the search engine 111 may include similar or different components.

Two or more of the search engine front end 105, the mixer engine 106, the query reviser engine 107, the ad selector engine 109, the auction engine 110, and the search engine 111 may be implemented on the same computing device, or on different computing devices. Because the search engine results page 101 is generated based on the collective activity of the search engine front end 105, the mixer engine 106, the query reviser engine 107, the ad selector engine 109, the auction engine 110, and the search engine 111, the user of the client device 101 may refer to these engines collectively as a "search engine." This specification, however, refers to the search engine 111, and not the collection of engines, as the "search engine," since the search engine 111 identifies the search results in response to the user-submitted search query.

In general, the search engine front end 105 receives queries from client devices, and routes the queries to the appropriate engines so that search engine results pages may be generated. In some implementations, routing occurs by referencing static routing tables, or routing may occur based on the current network load of an engine, so as to accomplish a load balancing function. The search engine front end 105 also provides the resulting search engine results pages to the respective client devices. In doing so, the search engine front end 105 acts as a gateway, or interface between client devices and the search engine 111.

The mixer engine 106 temporarily stores and collates data that is generated by the various engines, and generates search engine results pages using this data. The mixer engine 106 determines the sequence in which to request data from various engines, and submits formatted requests and receives responses from the various engines according to the desired sequence. The sequence may be determined from a sequence table or chart, or from rules that specify how particular types of queries are to be processed, and that identify the various engines that are to generate portions of the data that make up a search engine results page.

The query reviser engine 107 applies query terms, i.e., the initial query, to various query revision models, to generate additional queries that, in some implementations, match a same or a similar context as an input query. Several example query revision strategies which may be used by the query reviser engine 107 are described in U.S. Pat. No. 7,617,205, issued Nov. 10, 2009, which is incorporated by reference in the entirety (including its FIGS. 1A and 1B, which are incorporated by reference in particular), and U.S. Pat. App. Pub. No. 2006/0224554, published Oct. 5, 2006, which is incorporated by reference in the entirety (including its FIGS. 1A and 1B, which are incorporated by reference in particular).

In some implementations, the additional queries are relevant to the initial query, yet at the same time the additional queries may be required to be diverse with each other. Additional query selection is described below. In other implementations, additional queries are generated by the query reviser engine 107 before the initial query 120 is received.

The ad selector engine 109 selects candidate advertisements that are relevant to a query. This specification refers to an advertisement being "targeted" to a query when, for example, the advertisement is associated with a list of keywords that match one or more portions of the query. Accordingly, selecting a candidate advertisement that is targeted to a query may include generating n-grams from the query, and accessing a look-up table that cross-references n-grams with advertisements that are targeted to, or are otherwise associated with, a particular n-gram.

The mixer engine 106 may filter the candidate advertisements 124 before identifying the candidate advertisements to the auction engine 110. For instance the mixer engine 106 may filter duplicate advertisements, too many advertisements from the same advertiser, advertisements that have low satisfaction or interest scores, black-listed advertisements, or advertisements that are determined to be inappropriate for the user, advertisements that the user has indicated in their user preferences that they do not want to see, too many advertisements for the same query term, or other advertisements.

When an insufficient number of advertisements are selected, i.e., where the number of advertisements selected for a particular query does not satisfy a predetermined or dynamically determined threshold (e.g., "0", or "3"), the ad selector engine 109 may select additional advertisements, for example by broadening the advertisement selection parameters. Similarly, when too many advertisements are selected, i.e., where the number of advertisements selected for a particular query exceeds a different predetermined or dynamically determined threshold (e.g., "10", or "100"), the ad selector engine 109 may filter the selected advertisements, for example by narrowing the advertisement selection parameters. The query reviser engine 107 may also filter the candidate additional queries before identifying the additional queries to other components of the system in an attempt to filter out unhelpful suggestions prior to identifying ads.

The auction engine 110 selects a subset 125 of the candidate advertisements 124. For example, for each query terms, the auction engine 110 may perform a competition, i.e., an auction, in real-time to receiving the candidate advertisements 124, to select the top n advertisements for each query (i.e., initial query and each candidate query). Selecting a subset of the candidate advertisements may include selecting the same number of advertisements for each query, selecting different numbers of advertisements for each query, or determining, for a particular query, that no advertisements should be selected. In some implementations, because the suggested queries that were used to select the advertisements are diverse, and because the ad selector engine 109 may filter the candidate advertisements 124, the candidate advertisements 124 in the subset 125 of advertisements may also be diverse.

The search engine 111 searches for information that is accessible on the networks 104, thereby generating search results. The search engine 111 may perform a search using the initial query 120 only, using the initial query 120 and one or more of the additional queries 122, or using the initial query 120 and other data.

For privacy protection, any historical, behavioral or other data gathered can be made on an opt-in basis. Gathered data can be anonymized by various means. For example, the search engine 111 or query reviser engine 107 can provide additional query suggestions that are both relevant to the user's history while also protecting the user's privacy. For example, search history data can be anonymized for privacy protection, so that the data, if compromised, cannot be associated with a particular user or user identifier. Various anonymization processes, such as hashing, encryption and obfuscation techniques, can be used to ensure that subject privacy is protected.

In FIG. 1, a user of the client device 102 submits an initial search query 120 to the search engine front end 105 over the networks 104, during state (a). The user may submit the initial search query 120 by initiating a search dialogue on the client device 102, speaking or typing the terms of the initial search query 120, then pressing a search initiation button or control on the client device 102. The client device formulates the initial search query 120, and transmits the initial search query 120 over the networks 104.

Although this specification refers to the initial query 120 as an "initial" query, such reference is merely intended to distinguish this query from other queries, such as the additional, alternative, revised or suggested queries that are described below with respect to states (d) to (m). To be sure, the designation of the initial query 120 as "initial" is not intended to require the initial query 120 to be the first query that is entered by the user, or to be a query that is manually entered. For example, the initial query 120 may be the second or subsequent query entered by the user, or the initial query 120 may be automatically derived (e.g., by the query reviser engine 107) or may be modified based upon prior queries entered by the user, location information, and the like.

Furthermore, although state (a) describes an example where a user submits a search query, in other examples another type of request may be issued, such as a request for an advertisement. In a syndication example, an advertisement request may result in an ad block being sent to a user to be published on a page of content.

During state (b), the search engine front end 105 receives the initial query 120, and communicates the initial query 120 to the mixer engine 106. The search engine front end 105 may also append a flag to the initial query 120 to indicate that multiple advertisement blocks are to be included in the search engine results page 101. Alternatively, the mixer engine 106 may assign such a flag, or may attempt to generate advertisement blocks for all queries.

The mixer engine 106 obtains the initial query 120 and, during state (c), transmits the initial query 120 to the query reviser engine 107. The mixer engine 106 temporarily stores the initial query 120 and information identifying the client device 102, so that the resulting search engine results page 101 may be transmitted back to the client device 102.

During state (d), the query reviser engine 107 generates one or more additional queries 122 that relate to the initial query 120, and transmits the additional queries 122 to the mixer engine 106. In some implementations, the additional queries may be selected based the relevance of the additional queries to the initial query 120, based an extent to which the selected additional queries are diverse with each other, and/or based on the commerciality of the additional queries, i.e., the business value of the additional queries to the search engine provider. Generating additional queries may include generating candidate additional queries, and selecting a subset of the candidate additional queries based on any number of factors, including relevancy, diversity and/or commerciality. The mixer engine 101 temporarily stores information identifying the initial query 120 and the additional queries 122.

During state (e), the mixer engine 106 transmits the initial search query 120 and the additional queries 122 to the ad selector engine 109. The ad selector engine 109 selects one or more candidate advertisements that are targeted to the initial search query 120, and one or more candidate advertisements that are targeted to the additional queries 122. For example, the ad selector engine 109 may select one or more candidate advertisements 124 that are targeted to each of the additional queries 122, where some of the selected advertisements 124 may be targeted to more than one of the queries. The candidate ads for each query may be identified as candidates based on, for example, relevance to the query, ad quality, non-duplicative quality of the ad or advertiser, and/or a threshold number of ads to be selected as candidates. During state (f), the ad selector engine 109 transmits the selected advertisements 124, or information referencing the selected advertisements 124, to the mixer engine 106. The mixer engine 106 temporarily stores information referencing the selected advertisements 124.

During state (g), the mixer engine 106 transmits the selected advertisements, or information referencing the selected advertisements, to the auction engine 110. The auction engine 110 selects one or more subsets 125 of the advertisements using an auction such as, for example, a modified second price auction determining bids based on factors such as but not limited to advertiser maximum bid amounts, ad quality, ad click through rates, and, during state (h), transmits the advertisements of the subsets 125, or information referencing the advertisements of the subset 125, to the mixer engine 106. The mixer engine 106 temporarily stores information referencing the advertisements of the subset 125.

During state (i), the mixer engine 106 transmits the initial query 120 and, optionally, the additional queries 122 to the search engine 111. The search engine 111 generates search results that it identifies as being relevant to the initial query 120 and, if provided, one or more of the additional queries 122. In some implementations, during state (j), the search engine transmits the search results 126 to the mixer engine 106, which generates the search engine results page 101 that includes a reference 129 to the initial query 120 and references 130A-B to the additional queries, and that includes advertisements 131 from the subset 125 that are targeted to the initial query 120, advertisements 132 from the subset 125 that are targeted to a first additional query 122A, and advertisements 134 from the subset 125 that are targeted to a second additional query 122B.

The mixer engine 106 generates the search engine results page 101 using the information that it temporarily stored during states (b) to (k). In some implementations the search results may be generated while or before the auction engine 110 generated the subsets 125.

During state (k), the mixer engine 106 transmits code 135 (e.g., HyperText Markup Language code or eXtensible Markup Language code) for the search engine results page 101 to the search engine front end 105 which, during state (I), transmits the code 135 to the client device 102 over the networks 104, so the client device 102 can display the search engine results page 101.

The client device 102 invokes the code 135 (e.g., using a layout engine) and, as a result, displays the search engine results page 101 on the display 119. The initial query 120 is displayed in a query box (or "search box") 136, located for example, on the top of the search engine results page 101, and the search results 126 are displayed in a search results block 137, for example on the left hand side of the search engine results page 101. In some implementations, the right hand side of the search engine results page 101 defines an advertising region, including the reference 129 to the initial query 120, the reference 130A to the first additional query 122A, and the reference 130B to the second additional query 122B.

A first advertisement block 139 includes the reference 129 to the initial query 120 and the advertisements 131 of the subset 125 that are targeted to the initial query 120. A second advertisement block 140 includes the reference 130A to the first additional query 122A and the advertisements 132 of the subset 125 that are targeted to the first additional query 122A. A third advertisement block 141 includes the reference 130B to the second additional query 122B and the advertisements 134 of the subset 125 that are targeted to the second additional query 122B.

The references 129, 130 may be textual or graphical references, or the references 129, 130 may include hyperlinks that, when selected, cause the client device 102 to submit a new initial search query that includes, as a query term(s), the query associated with the hyperlink. In doing so, a reference 130 to an additional query 122 may be used to initiate a new search query using the additional query 122.

Figure 2A:
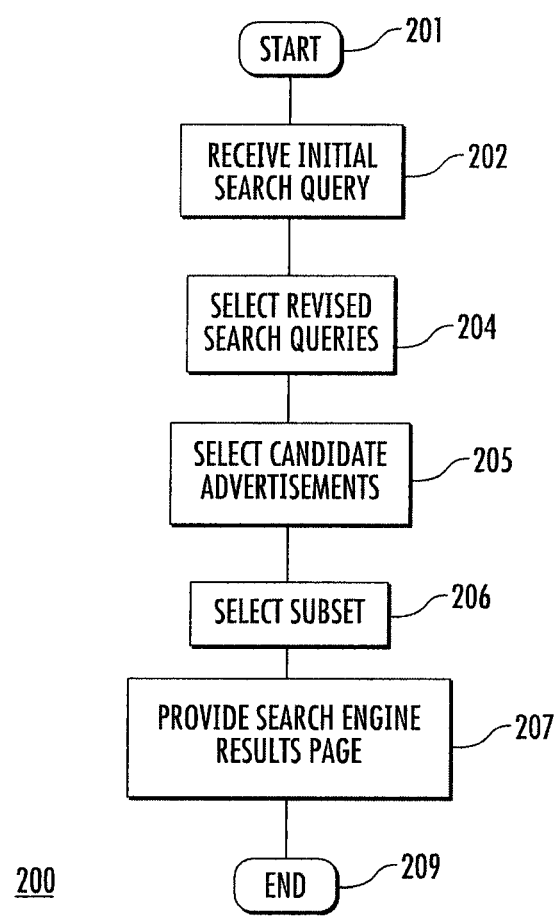
FIGS. 2A and 2B are flowcharts of example processes.

FIG. 2A is a flowchart of an example process 200. Briefly, the process 200 includes receiving an initial query, selecting one or more additional queries that relate to the initial query, selecting one or more advertisements that are relevant to the initial query, and one or more advertisements that are relevant to each additional query, selecting a subset of the advertisements, and providing a search engine results page that includes a reference to the initial query and to each additional query, and that includes advertisements from the subset that are targeted to the initial query, and advertisements from the subset that are targeted to each additional query.

In more detail, when the process 200 begins (201), an initial query is received (202). The initial query may be included in a search query (e.g., a text-based query, a voice query, or an image query) that the user submits through a client device, such as a desktop computer or a smart phone. Other data, such as context data, browser header data, previous user queries, location data, user interest data, web history, and the like, may also be received with the initial query.

One or more additional queries that relate to the initial query are selected (204). Revised query terms may be obtained by applying an initial query to a query revision model that identifies additional queries that match a same context as the initial query. For example, additional queries may be obtained by applying a synonym model which replaces portions of the initial query with synonyms of those portions.

Selecting additional queries may include generating multiple candidate additional queries, and filtering or otherwise excluding particular candidate additional queries. For instance, as a result of applying a semantic drift detection process to a particular candidate additional query, a query reviser engine may determine that semantic drift has occurred, and the particular candidate additional query may be filtered. Duplicate candidate additional queries, candidate additional queries that do not exhibit sufficient diversity or commerciality i.e., as reflected in a diversity or commerciality score, or other candidate additional queries may also be filtered when selecting additional queries.

In some implementations, one or more advertisements that are relevant to the initial query are selected, as are one or more advertisements that are relevant to each additional query (205). Selecting an advertisement may include selecting advertisements that are associated with keywords that make up the query, and/or filtering advertisements that are unlikely to be selected by the user (e.g., duplicate or inappropriate advertisements).

A subset of the advertisements is selected (206). Selecting the subset may include selecting a number n of advertisements to be shown in a display block for each query (e.g., "3" for each query, or "1" for the initial query and "2" each for the additional queries), and selecting, as the subset, the n advertisements that have the highest quality. Other criteria can be used, such as advertisements whose advertisers have bid the highest amount of money to be displayed on the search engine results page. For example, the advertisements that have the highest effective ad ranking taking into account advertiser maximum bid (typically in cost-per-click terms), ad quality, ad click-through-rate (such as for each candidate ad relative to the next highest bid ad), and the like for each candidate ad in the subset of advertisements selected for potential display for a particular query. The selection of an advertisement for one query may affect the selection of an advertisement for another query, for example to exclude duplicate advertisements or advertisements from the same advertiser on the same search engine results page.

A search engine results page is provided that includes a reference to the initial query and to each additional query, and that includes advertisements from the subset that are targeted to the initial query, and advertisements from the subset that are targeted to each additional query (207), thereby ending the process 200 (209). The reference to each query may be a textual reference, or may be a hyperlink that, when selected, submits a new search query using a query (e.g., the terms) that is (are) identified by the hyperlink. A result may also be a script or link that activates a web-based application (including a specialized search application such as a map search, product search, video playback, Adobe Flash or HTML5 content, and the like), or client software when authorized by the user. The references and advertisements may be displayed in an advertising region of the search engine results page, such as along the bottom or the right hand side of the search engine results page.

In some implementations, the references to the initial query and to each additional query are displayed, but no advertisements are displayed for the initial query, or for one or more of the additional queries. In such implementations, a control on the search engine results page may be selected by the user to cause some advertisements, or additional advertisements, to be displayed. In some implementations, advertisements are displayed for the initial query and for the additional queries, but no reference is displayed for the initial query, or for one or more of the additional queries.

Figure 2B:
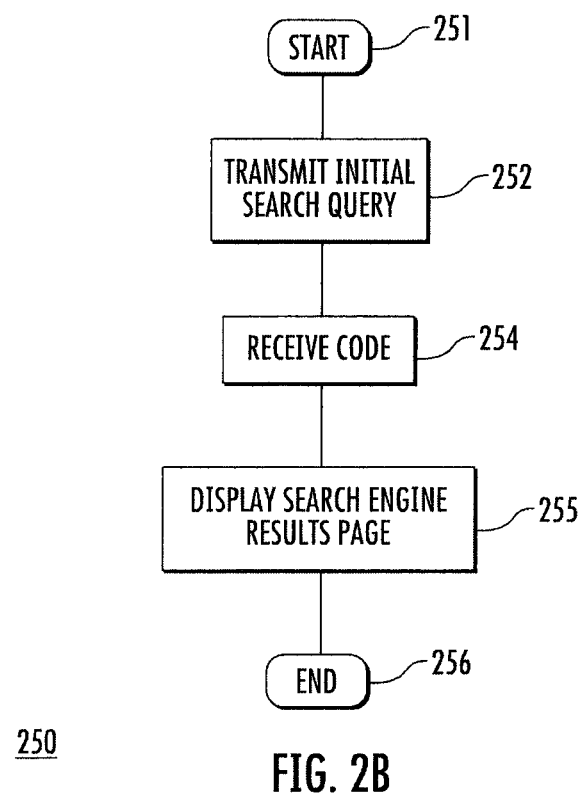

FIG. 2B is a flowchart of an example process 250. Briefly, the process 250 includes transmitting, by a client device, an initial query, receiving, by the client device, code for a search engine results page that includes a reference to the initial query and to one or more additional queries that relate to the initial query, and that further includes one or more advertisements that are relevant to the initial query, and one or more advertisements that are relevant to each additional query, and displaying, by the client device, the search engine results page.

In more detail, when the process 250 begins (251), a client device transmits an initial query (252). The search query may be transmitted over a network, for example when the user enters text into a query box on the user interface of the client device, and selects a control to submit the initial query. Alternatively, the initial query may be submitted without requiring a user interaction, for example when the client device recognizes a query term from the speech of a user, or uses the current location of the mobile device as a query term, and automatically submits the initial query to the search engine to obtain information for display before the user asks for it.

The client device receives code for a search engine results page that includes a reference to the initial query and to one or more additional queries that relate to the initial query, and that further includes one or more advertisements that are relevant to the initial query, and one or more advertisements that are relevant to each additional query (254). The code may be markup language code, such as HTML or XML code, that may be interpreted by a layout engine or a browser. The client device displays the search engine results page (255), thereby ending the process 250 (256).

FIGS. 3A to 3E show example search engine results pages 300, 310, 320, 330, and 340, respectively. The search engine results pages 300, 310, 320, 330, and 340 illustrate several ways in which the references to the queries and the various respective advertisements for each query may be arranged.

Figure 3A2:
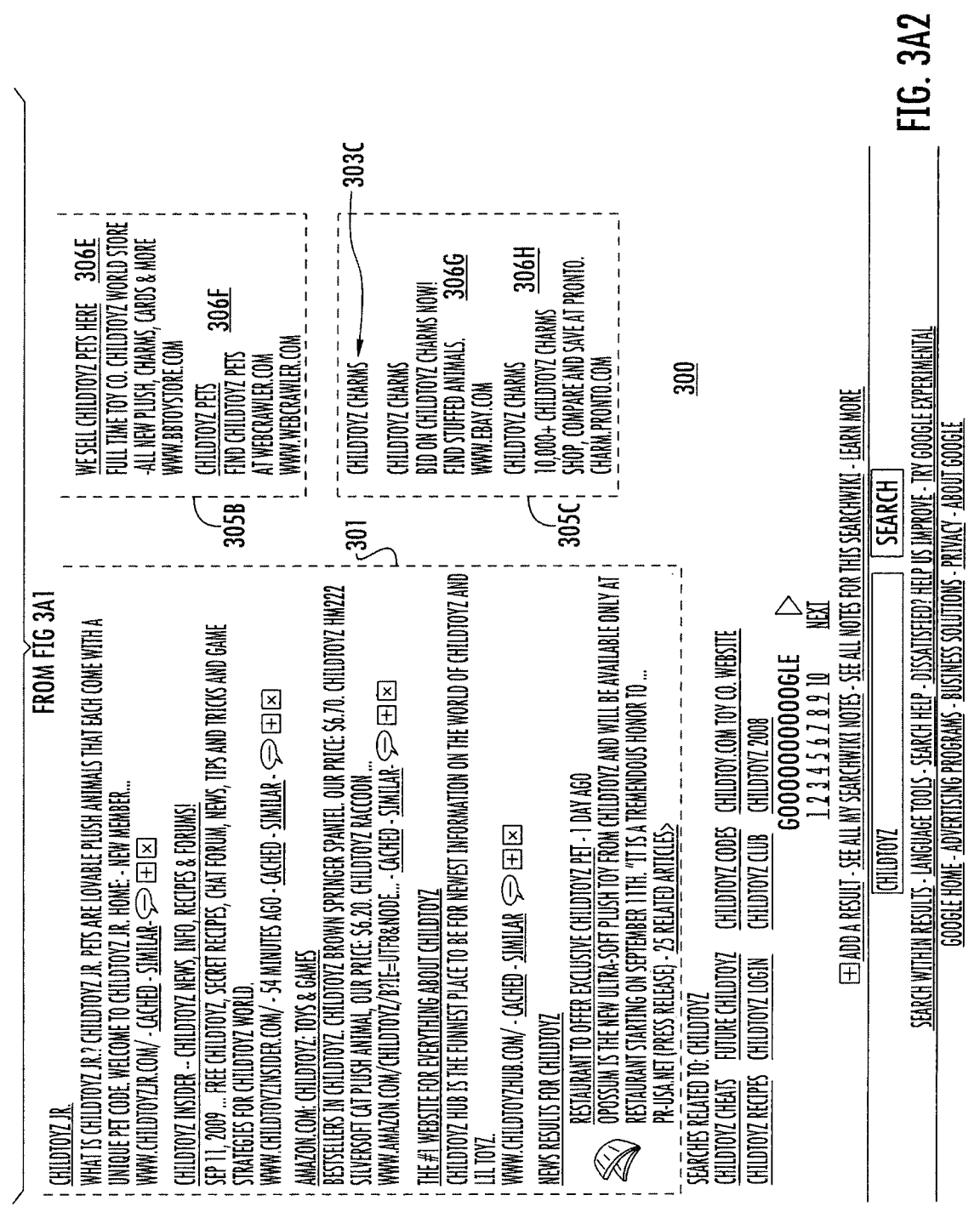

In FIG. 3A, the search engine results page 300 includes a search results block 301 that includes search results that a search engine has identified as being relevant to the initial query 302 (in the figure, "childztoyz"). The search engine results page also includes references 303A to 303C to each additional query (in the figure, "childztoyz trading cards," "childztoyz pets," and "childztoyz charms," respectively). The search engine results page 300 also includes an advertising block 304 that includes an advertisement 306A that is targeted to the initial query 302, an advertising block 305A that includes reference 303A and advertisements 306B-D that are targeted to the additional query 303A, an advertising block 305B that includes reference 306B and advertisements 306E-F that are targeted to the additional query 303B, and an advertising block 305C that includes reference 303C and advertisements 306G-H that are targeted to the additional query 303C. Notably, the search engine results page 300 does not include a reference that references the initial query 302 directly above the advertising block 304. The additional advertising blocks may be displayed in order of, for example, relevance of each additional query to the initial query, historical click through rate for the ads in each ad block, number of ads available for each ad block, random placement, and the like.

In FIG. 3B, the search engine results page 310 includes a search results block 311 that includes search results that a search engine has identified as being relevant to the initial query 312 (in the figure, "childztoyz"). The search engine results page also includes references 313A-C to each additional query (in the figure, "childztoyz trading cards," "childztoyz pets," and "childztoyz charms," respectively). The search engine results page 310 also includes an advertising block 314 that includes an advertisement 316A that is targeted to the initial query 312, an advertising block 315A that includes the reference 313A and advertisements 316B-D that are targeted to the additional query 313A, an advertising block 315B that includes reference 313B and advertisements 316E-F that are targeted to the additional query 313B, and an advertising block 315C that includes the reference 313C and advertisements 316G-H that are targeted to the additional query 313C.

Notably, and instead of merely including static textual data, the references 313A-C each define hyperlinks that, when selected by the user, initiate a new search query using the additional query. Moreover, the advertising blocks 315A-C include controls 317A-C, respectively, that, when selected, cause additional advertisements that are targeted to the corresponding additional queries to be obtained and/or displayed, or that cause some advertisements to be obtained or displayed if none are shown. Although the controls 317A-C are illustrated as user-selectable boxes that reveal additional content to the user (sometimes referred to as a "plusbox"), other types of controls may also be used.

Figure 3C:
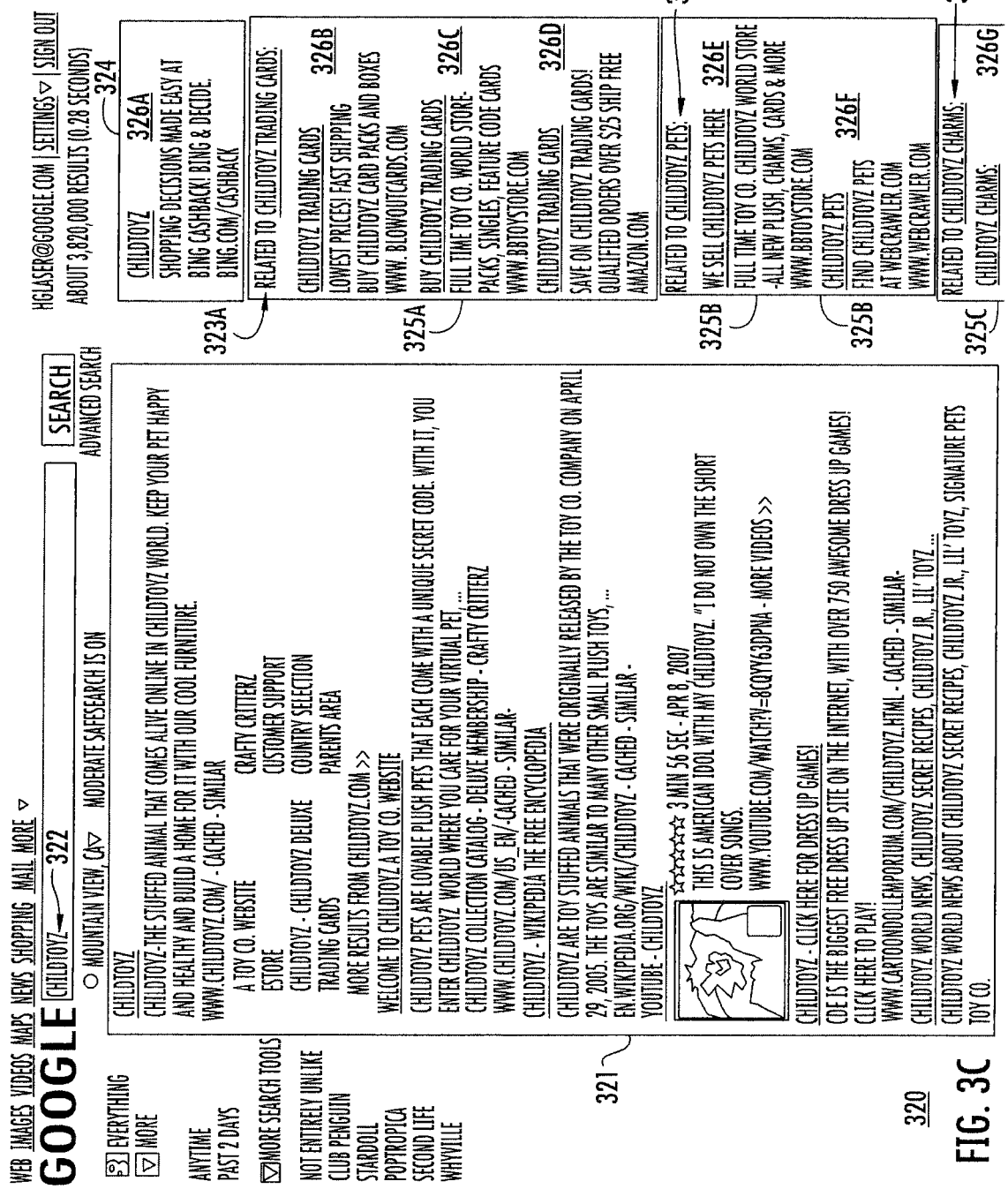

In FIG. 3C, the search engine results page 320 includes a search results block 321 that includes search results that a search engine has identified as being relevant to the initial query 322 (in the figure, "childztoyz"). The search engine results page also includes references 323A-C to each additional query (in the figure, "childztoyz trading cards," "childztoyz pets," and "childztoyz charms," respectively). The search engine results page 320 also includes an advertising block 324 that includes an advertisement 326A that is targeted to the initial query 322, an advertising block 325A that includes the reference 323A and advertisements 326B-D that are targeted to the additional query 323A, an advertising block 325B that includes the reference 323B and advertisements 326E-F that are targeted to the additional query 323B, and an advertising block 325C that includes the reference 323C and advertisement 326G that is targeted to the additional query 323C. Notably, the references 323A-C are, in some embodiments, displayed in a larger font than the references 313A-C of FIG. 3B, to allow the user to see the additional queries more easily.

Figure 3D:
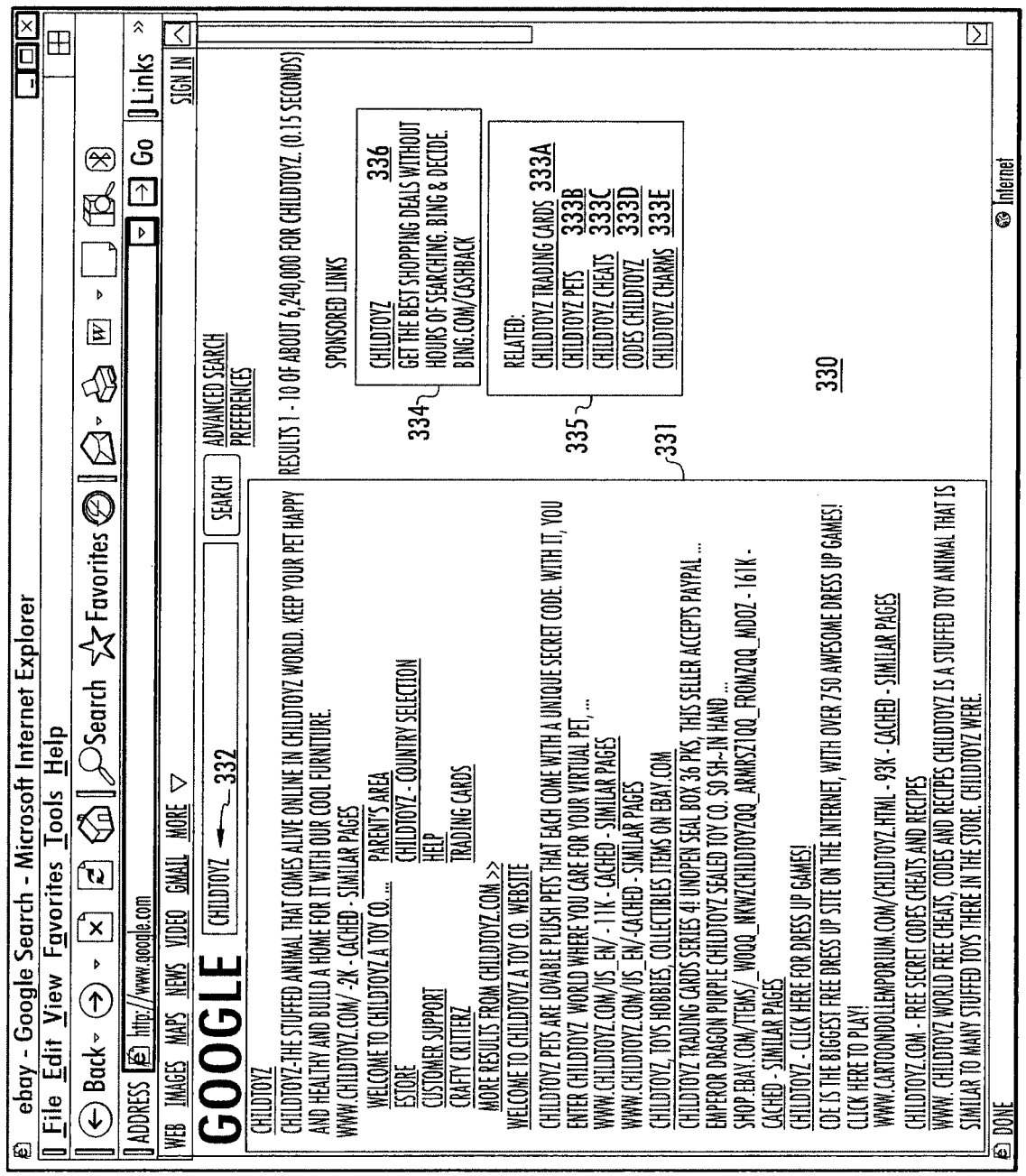

In FIG. 3D, the search engine results page 330 includes a search results block 331 that includes search results that a search engine has identified as being relevant to the initial query 332 (in the figure, "childztoyz"). The search engine results page also includes references 333A-E to each additional query (in the figure, "childztoyz trading cards," "childztoyz pets," "childztoyz cheats," "codes childztoyz," and "childztoyz charms," respectively). The search engine results page 330 also includes an advertising block 334 that includes an advertisement 336 that is targeted to the initial query 332.

The search engine results page 330 also includes a suggested query term block 335 that references the additional queries 333A-E, however the suggested query term block 335 does not include advertisements or advertisement blocks that are targeted to the additional queries 333A-E. The auction engine, ad selector engine, or mixer engine may choose to not include advertising blocks if an insufficient number of advertisements are located, or if, for example, the selected advertisements do not satisfy predetermined relevancy and/or diversity scores. For example, advertisements may not be included in the search engine results page 330 if the auction engine, ad selector engine, or mixer engine determine that the revised queries do not share a common context, i.e., a semantic drift has occurred. Semantic drift can be determined by, for example, a particularly low relevance or low click-through-rate for a particular revised query with respect to an initial query.

Figure 3E:
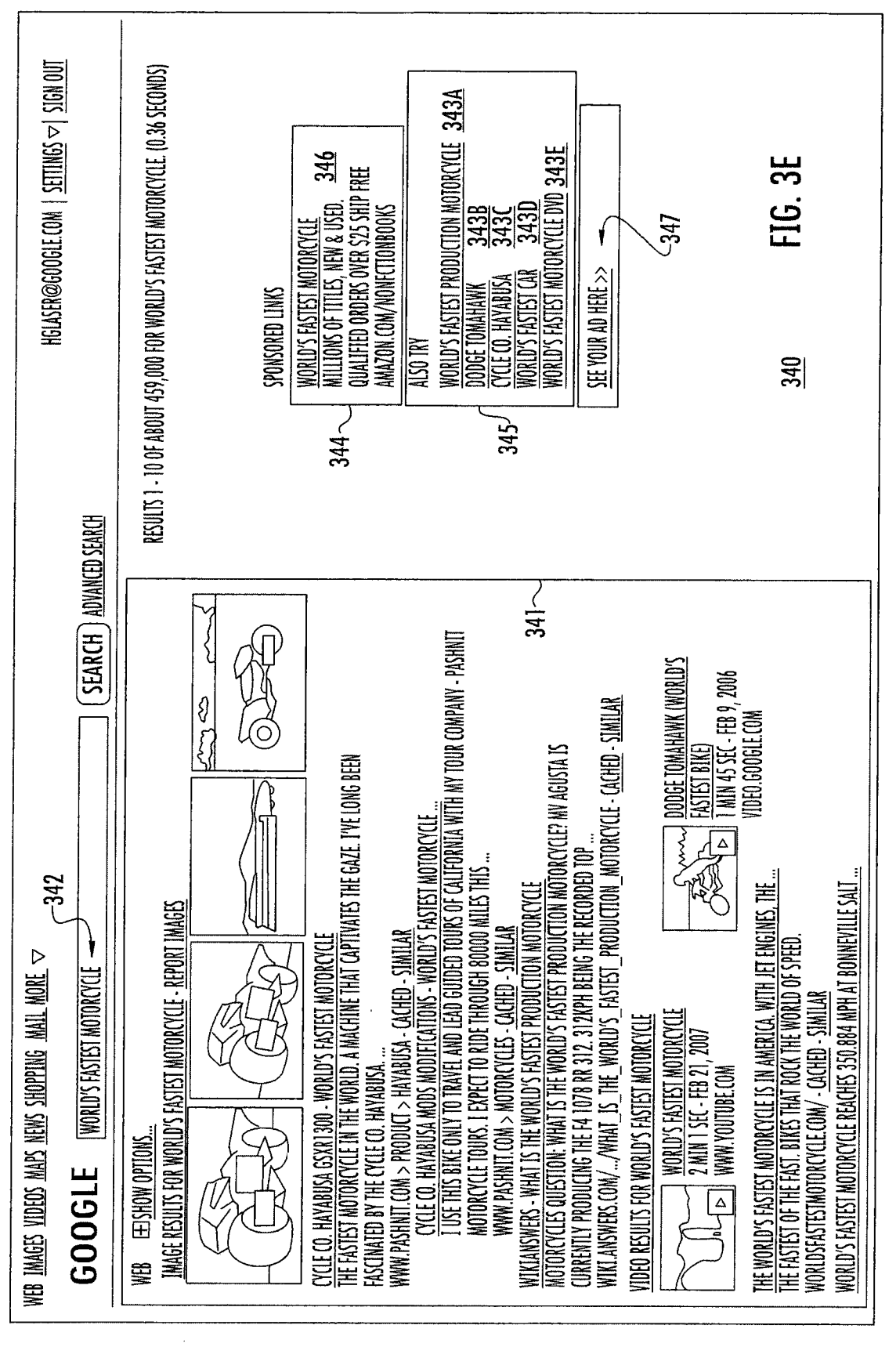

In FIG. 3E, the search engine results page 340 includes a search results block 341 that includes search results that a search engine has identified as being relevant to the initial query 342 (in the figure, "world's fastest motorcycle"). The search engine results page also includes references 343A-E to each additional query (in the figure, "world's fastest production motorcycle," "dodge tomahawk," "Suzuki hayabusa," "world's fastest car," and "world's fastest motorcycle DVD," respectively). The search engine results page 340 also includes an advertising block 344 that includes an advertisement 346 that is targeted to the initial query 342.

The search engine results page 340 also includes an additional query block 345 that references the additional queries 343A-E, however the additional query block 345 does not include advertisements that are targeted to the additional queries 343A-E. The auction engine, ad selector engine, or mixer engine may choose to not include advertising blocks if, for example, an insufficient number of advertisements are located, or if the selected advertisements do not satisfy predetermined relevancy and/or diversity scores. For example, advertisements may not be included in the search engine results page 340 if the auction engine, ad selector engine, or mixer engine determine that the revised queries do not share a common context, i.e., a semantic drift has occurred. Notably, however, the search engine results page 340 includes an auction participation link 347 that, when selected by the user, establishes a dialogue to invite the user to submit advertisements that may be displayed in an advertisement block for future search queries.

As described above, one or more additional queries may be determined for an initial query. The query reviser engine 107 generates one or more additional queries 122 that relate to the initial query 120, and transmits the additional queries 122 to the mixer engine 106. Filtering of additional queries may be beneficial to ensure that only particularly relevant queries are presented to the user.

Systems, methods, apparatus, and computer program products are described for providing relevant content to users. In some implementations, methods are provided that determine one or more content items to be provided to users based on receipt of an initial query. The initial query can lead to the development of one or more additional queries relevant to the initial query. One or more of the additional queries may be determined to be not particularly relevant to the initial query based on historical or commercial factors, based on predictive signals, models, and rules of thumb, or based on other factors. The one or more additional queries that are not particularly relevant can be filtered out from consideration for additional processing, such as for example identifying and providing particular content items to be associated therewith. Other filtering can also occur, such as after content items have be determined for each additional query.

Figure 4:
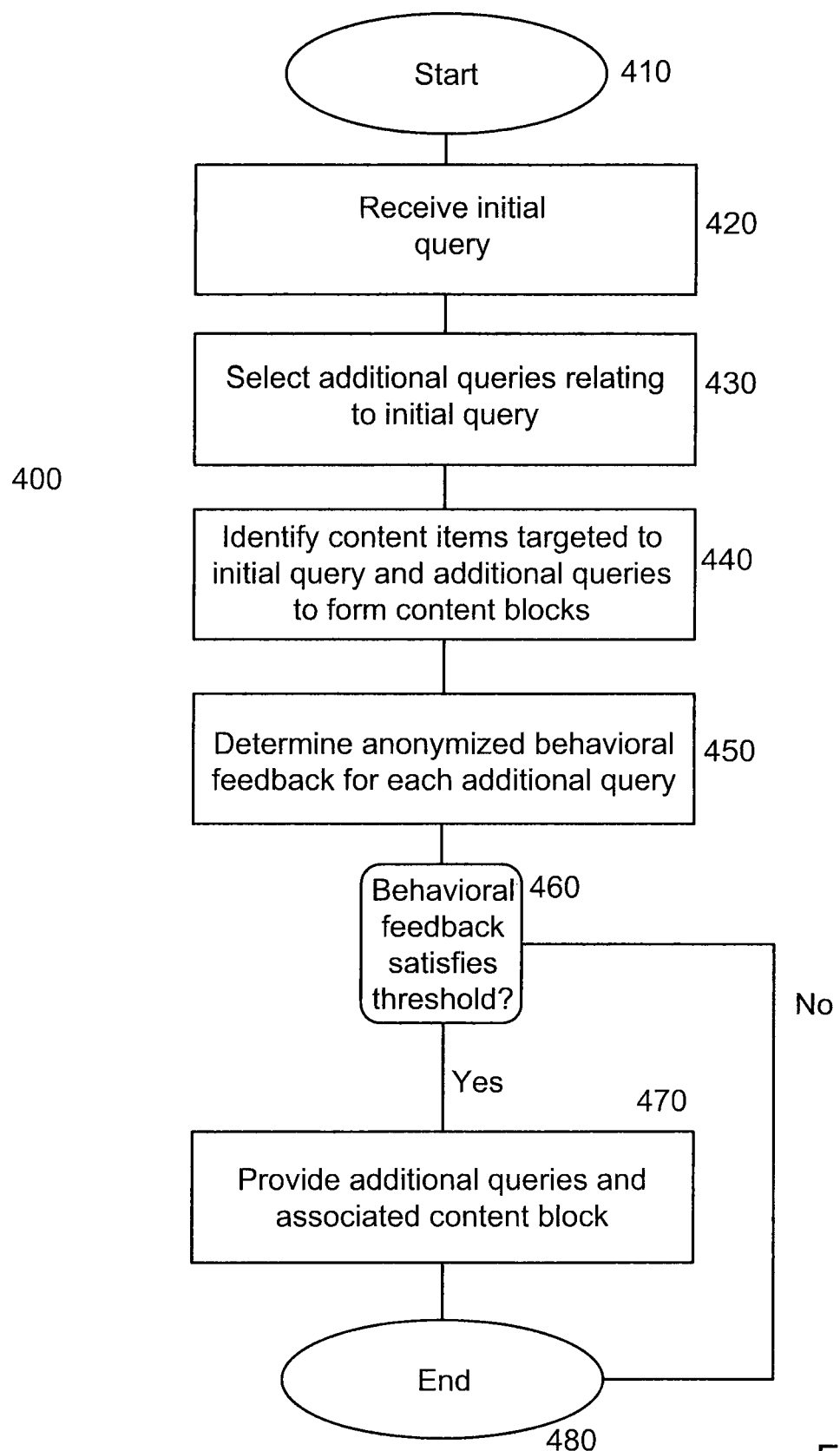
FIG. 4 is a flowchart of an example process for filtering additional queries and content items based on anonymized behavioral feedback.

FIG. 4. is a block diagram of an example method 400. Method 400 includes various steps including receiving an initial query, selecting additional queries relating to the initial query, identifying content items targeted to the initial query and additional queries and grouping those content items into content blocks. Anonymized behavioral feedback for each additional query can be determined, and the additional queries and associated content blocks can be provided, such as to a device for display to a user if the anonymized behavioral feedback satisfies a threshold. This method can for example be carried out by one or more of the mixer engine 106, search engine 111, search engine front end 105, query reviser engine 107, and/or ad selector engine 109 as illustrated in FIG. 1.

In more detail, at stage 420 an initial query is received. For example, an initial query can be received by the search engine front end 105 over the network 104 from a user entering a query into a search control 120 in, for example, a browser 101 executing on a client device 102. An initial query may contain one or more terms relating to topics that the user is interested in.

At stage 430, additional queries relating to the initial query are selected. For example, query reviser engine 107 can select one or more additional queries based on, for example, a context associated with the initial query. The additional queries can be queries that a user would find useful or interesting based upon the initial query. In some implementations, the additional queries can be queries that are provided by users after entering the initial query. For example, in FIG. 3C, the query "childztoyz" 322 may be relate to additional queries, including for example, "childztoyz trading cards" 323A or "childztoyz pets" 323B. These additional queries may be useful for a user searching for the initial query "childztoyz" 322.

At stage 440, content items targeted to the initial query and additional queries are identified. The content items can be grouped by their associated additional queries into content blocks. For example, the mixer engine 106 can receive additional query terms 122 from the query reviser engine 107. The ad selector engine 109 can receive an initial query 120 and additional queries 122 from the mixer engine 106, and can form content blocks containing content items. For example, the content items may include candidate advertisements 124 organized into content blocks. As shown in FIG. 3C, on the right hand side of the screen shot the initial query, a plurality of additional queries, and blocks containing content items are provided.

At stage 450, anonymized behavioral feedback for each additional query is determined. For example, a user on a client device 102 may click on content block 139, causing search engine front end 105 to report to mixer engine 106 that a click occurred on the content block 139. For example, anonymized historical data can be gathered on an opt-in basis that is indicative of the performance of one or more content items in a given block. The performance data can be a measure, for example, of the number of impressions of a content item or block, the click-through rate for a content item or block, a human evaluation of the relevance of the additional query to the initial query, or a measure of a loss in clicks associated with displaying an additional query that users did not find relevant or useful, or by any combination of these or other behavioral feedback items.

At stage 460, the anonymized behavioral feedback is checked to determine if it satisfies a threshold. The threshold can, for example, be a minimum number of impressions, a minimum click-through rate, a minimum selection criterion as defined by human evaluators, or a maximum number of lost clicks due to displaying the content block associated with the additional query.

If the threshold is satisfied, the additional queries and associated content blocks are displayed 470. The content blocks can include content items. As shown in FIG. 3C, for example, the content items can be in the form of an ad. The ad can be in the form of a creative, and a creative can include a plurality of lines including a title and, for example, two other lines of textual material. The creative can also include a displayed URL that links to a landing page.

The processes depicted in this and accompanying figures do not necessarily require the particular order shown, or sequential order, to achieve desirable results. In certain implementations, multitasking and parallel processing may be advantageous.

A threshold may also be determined for the individual content items within the content blocks. The threshold can, for example, be a minimum number of impressions, a minimum click-through rate, a minimum selection criterion as determined by human evaluators, or a maximum number of lost clicks due to displaying the content item associated with the additional query.

In some implementations, individual content items must satisfy a threshold as well as the content blocks. Therefore, content items may only be displayed if both the threshold for the additional query associated content block is satisfied and the threshold for the individual content items is satisfied.

Signals can be used to determine whether the additional query and associated content block satisfies a threshold. If the threshold is satisfied, the additional queries and associated content blocks can be displayed.

Signals may be human-generated, machine-generated, or a combination of both. Human-generated signals, for example, can be input to a machine learning system. The machine learning system can then develop other signals found to be useful in setting thresholds for the additional queries and associated content blocks. In some implementations, signals are used alone or in combination to determine thresholds for additional queries and associated content blocks.

Signals can be combined to develop signals particularly indicative of additional queries that are likely to be of no or most interest to the user. Signals may include, for example, an initial query frequency, whether the initial query contained regular ads, whether the initial query was a product search query, whether the additional query is a product search query, the initial query is not a product query but the additional query is a product query, a number of words in the initial query, the industry vertical category of the initial query, the industry vertical category of the additional query, the initial query and additional query are in different industry verticals, whether the initial query is the name of a person, whether the additional query is the name of a person, whether the additional query contains a location, whether the additional query is missing a location, the initial query contains a location and the additional query contains a location and the distance between the locations is less than a distance threshold, the Markov utility of the additional query for the initial query, the Markov incremental utility of the additional query for the initial query and the additional queries already selected, whether the initial query contains pornography terms, whether the initial query contains the additional query, whether the additional query contains the initial query, whether the initial query contains some of the additional query, whether the additional query contains some of the initial query, whether none of the initial query is present in the additional query, the edit distance between the initial query and additional query, the contextual similarity between the initial query and additional query determined by looking at co-occurrences of the two queries on a Web repository, the snippet similarity between search results of the initial query and search results of additional query, the common domains in search results for the initial query and search results for the additional query, whether the search results for the initial query and additional query have no domains in common within a the top number of search results, whether the initial query is navigational, whether the additional query is navigational, whether the initial query is misspelled, whether the additional query is misspelled, the language of the initial query, the language of the additional query, the percentage of users who submit the additional query after the initial query, and the ratio of popularity of the additional query to popularity of the initial query.

Figure 5:
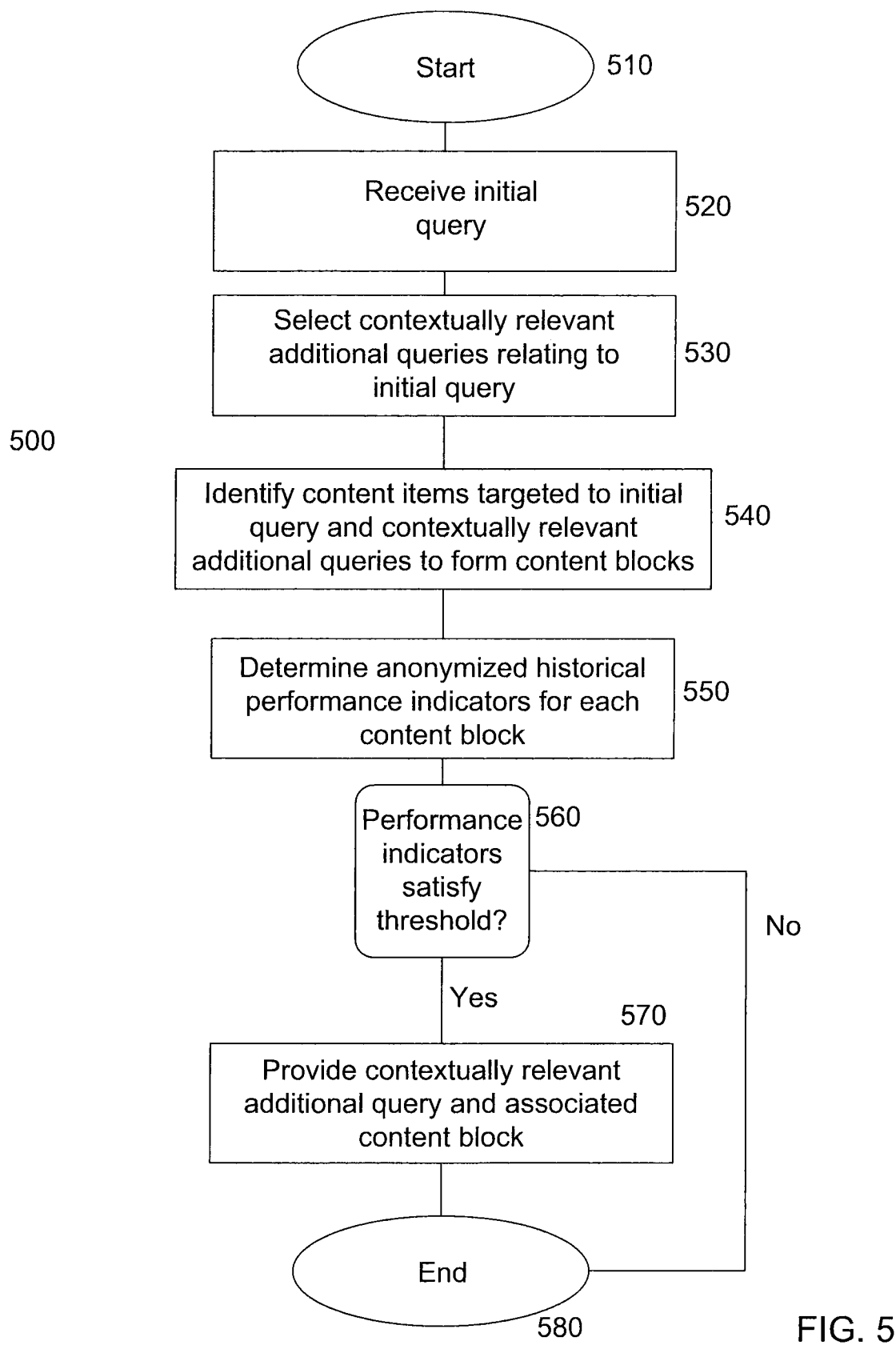
FIG. 5 is a flowchart of an example process for filtering additional queries and content items based on anonymized historical performance indicators.

FIG. 5 is a block diagram of an example method 500. Method 500 includes receiving an initial query, selecting contextually relevant additional queries related to the initial query, identifying content items that are targeted to the initial query and contextually relevant to the additional queries, and grouping these content items into content blocks. Anonymized historical performance indicators for each content block can be determined, and the contextually relevant additional queries and associated content blocks can be provided, such as to a device for display to a user if the anonymized historical performance indicators satisfy a threshold. This method can for example be carried out by one or more of the mixer engine 106, the search engine 111, the search engine front end 105, the query reviser engine 107, and/or the ad selector engine 109 as illustrated in FIG. 1.

In more detail, at stage 520 an initial query is received. For example, an initial query can be received by the search engine front end 105 over the network 104 from a user entering a query into a search control 120 in, for example, a browser 101 executing on a client device 102. An initial query may contain one or more terms relating to topics that the user is interested in.

At stage 530, contextually relevant additional queries relating to the initial query are selected. For example, query reviser engine 107 can select one or more contextually relevant additional queries based on, for example, a context associated with the initial query. For example, in FIG. 3C, the query "childztoyz" 322 may be contextually relevant to the additional queries "childztoyz trading cards" 323A or "childztoyz pets" 323B.

At stage 540, content items targeted to the initial query and contextually relevant additional queries are identified. The content items can be grouped by their contextually relevant additional queries into content blocks. For example, the mixer engine 106 can receive contextually relevant additional query terms 122 from the query reviser engine 107. The ad selector engine 109 can receive an initial query 120 and contextually relevant additional queries 122 from the mixer engine 106, and can form content blocks containing content items. For example, the content items may include candidate advertisements 124 organized into content blocks. As shown in FIG. 3C, on the right hand side of the screen shot the initial query, a plurality of contextually relevant additional queries, and blocks containing content items are provided.

At stage 550, anonymized historical performance indicators for each content block are determined. For example, a user on a client device 102 may click on content block 139, causing search engine front end 105 to report to mixer engine 106 the anonymized historical performance indicator that a click occurred on the content block 139. These indicators can be a measure, for example, of the number of impressions of a content item or block, the click-through rate of a content item or block, a human evaluation of the contextual relevance of the additional query to the initial query, or a measure of a loss in clicks associated with displaying an additional query that users did not find contextually relevant or useful, or any combination of these or other historical performance indicators. Other anonymized historical information may be used. Anonymized historical information can be learned from, for example on an opt-in basis, evaluation of anonymized log data. Alternatively, one or more tools may be used, again for example on an opt-in basis, to collect the anonymized historical information.

At stage 560, the anonymized historical performance is checked to see if it satisfies a threshold. This threshold can, for example, be a minimum number of impressions, a minimum click-through rate, a minimum selection criterion as defined by human evaluators, or a maximum number of lost clicks due to displaying the content block associated with the contextually relevant additional query.

If the threshold is satisfied, the additional queries and associated content blocks are further processed, such as for example being provided to a client device for display 570. The content blocks can include content items. The content items, can for example, include items such as ads, as set forth above with respect to FIG. 4.

A threshold may also be determined for the individual content items within the content blocks. The threshold can, for example, be a minimum number of impressions, a minimum click-through rate, a minimum selection criterion as determined by human evaluators, or a maximum number of lost clicks due to displaying the content item associated with the contextually relevant additional query.

In some implementations, individual content items must satisfy a threshold as well as the content blocks. Therefore, content items may only be displayed if both the threshold for the contextually relevant additional query is satisfied and the threshold for the individual content items is satisfied.

Signals can be used to determine whether the contextually relevant additional query and associated content block satisfies a threshold. If the threshold is satisfied, the additional queries and associated content blocks can be displayed.

Signals used can be those as set forth above with respect to FIG. 4. Signals may be human-generated, machine-generated, or a combination of both. Human-generated signals, for example, can be input to a machine learning system. The machine learning system can then develop other signals found to be useful in setting thresholds for the contextually relevant additional queries and associated content blocks. In some implementations, signals are used alone or in combination to determine thresholds for contextually relevant additional queries and associated content blocks.

Figure 6:
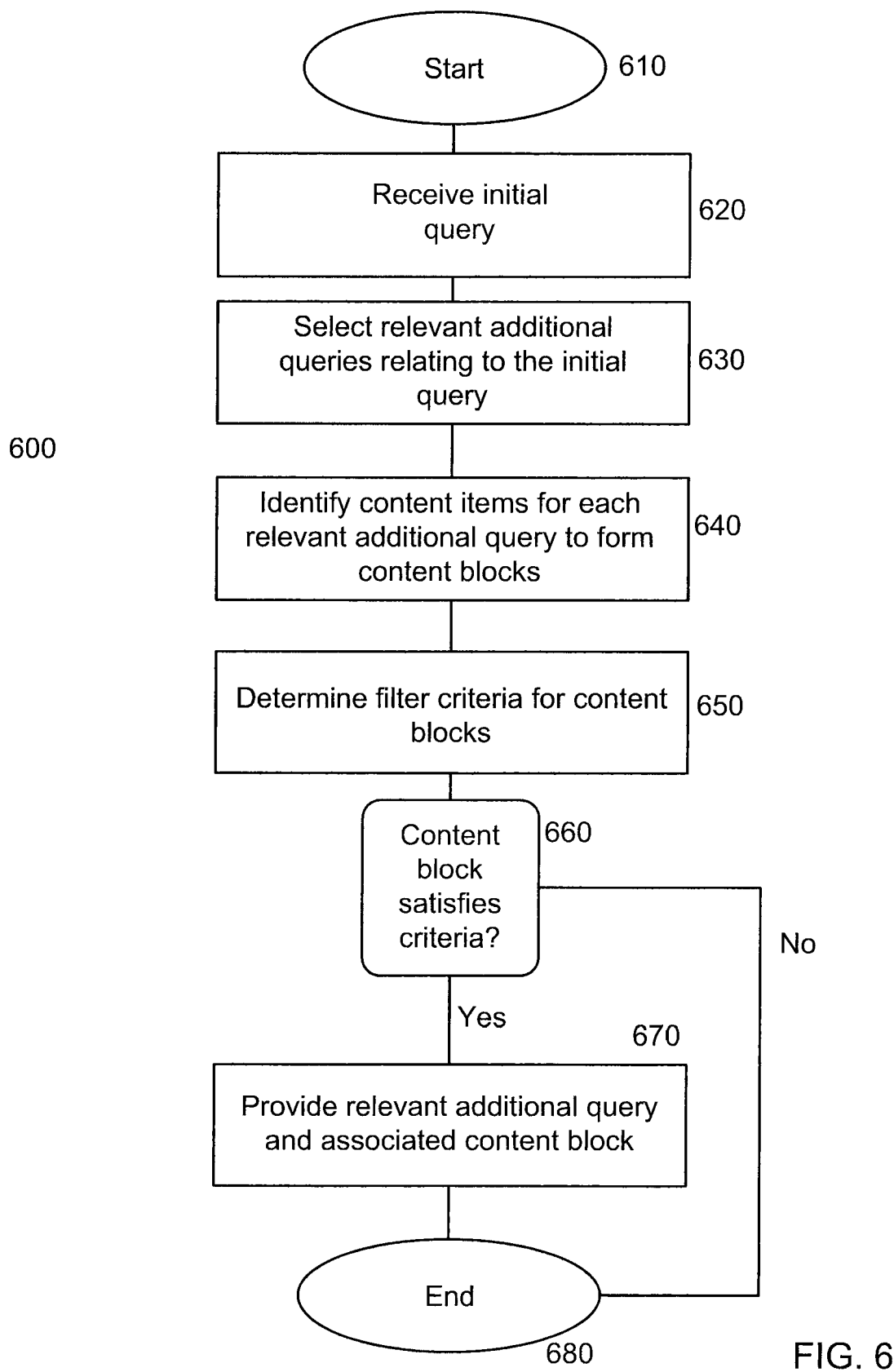
FIG. 6 is a flowchart of an example process for filtering additional queries and content items based on a filter criterion.

FIG. 6 is a block diagram of an example method 600. Method 600 includes receiving an initial query, selecting relevant additional queries relating to the initial query, identifying content items for each of the relevant additional queries, and grouping those content items into content blocks. Filter criteria for each content block can be determined, and the relevant additional queries and associated content blocks can be provided, such as to a device for display to a user if the filter criteria are satisfied. This method can for example be carried out by one or more of the mixer engine 106, the search engine 111, the search engine front end 105, the query reviser engine 107, and the ad selector engine 109 as illustrated in FIG. 1.

In more detail, at stage 620 an initial query is received. For example, an initial query can be received by the search engine front end 105 over the network 104 from a user entering a query into a search control 120 in, for example, a browser 101 executing on a client device 102. An initial query may contain one or more terms relating to topics that the user is interested in.

At stage 630, additional queries relevant to the initial query are selected. For example, query reviser engine 107 can select one or more additional queries based on, for example, the relevance to the initial query. For example, in FIG. 3C, the query "childztoyz" 322 may be relevant to additional queries "childztoyz trading cards" 323A or "childztoyz pets" 323B. These additional queries are likely to be useful for a user searching for the initial query "childztoyz" 322. Other criteria may be used for selecting additional queries, such as for example diversity, utilization, or commerciality considerations.

At stage 640, content items targeted to the initial query and relevant additional queries are identified. The content items can be grouped by their associated relevant additional queries into content blocks. For example, the mixer engine 106 can receive relevant additional query terms 122 from the query reviser engine 107. The ad selector engine 109 can receive an initial query 120 and relevant additional queries 122 from the mixer engine 106, and can form content blocks containing content items. For example, the content items may include candidate advertisements 124 organized into content blocks. As shown in FIG. 3C, on the right hand side of the screen shot the initial query, a plurality of relevant additional queries, and blocks containing content items are provided.

At stage 650, one or more filter criteria for each relevant additional query are determined. For example, a user on a client device 102 may click on content block 139, causing search engine front end 105 to report to mixer engine 106 the performance indicator that a click occurred on the content block 139. This performance indicator can be used as a filter-criterion for relevant additional queries. Filter criteria can include, for example, the number of impressions of a content item or block, the click-through rate of a content item or block, a human evaluation of the relevance of the additional query to the initial query, or a measure of a loss in clicks associated with displaying an additional query that users did not find relevant or useful, or any combination of these or other behavioral feedback items.

At stage 660, the filter criterion is checked to determine if it is satisfied. This criterion can, for example, be a minimum number of impressions, a minimum click-through rate, a minimum selection criterion as defined by human evaluators, or a maximum number of lost clicks due to displaying the content block associated with the additional query.

If the filter criterion is satisfied, the additional queries and associated content blocks are displayed 670. The content blocks can include content items. The content items, can for example, include items such as ads, as set forth above with respect to FIG. 4.

A threshold may also be determined for the individual content items within the content blocks. The threshold can, for example, be a minimum number of impressions, a minimum click-through rate, a minimum selection criterion as determined by human evaluators, or a maximum number of lost clicks due to displaying the content item associated with the additional query.

In some implementations, individual content items must satisfy a-filter criteria as well as the content blocks. Therefore, content items may only be displayed if both the filter criteria for the additional query are satisfied and the threshold for the individual content items is satisfied.

Signals can be used to determine whether the relevant additional query and associated content block satisfies a threshold. If the threshold is satisfied, the additional queries and associated content blocks can be displayed.

Signals used can be those as set forth above with respect to FIG. 4. Signals may be human-generated, machine-generated, or a combination of both. Human-generated signals, for example, can be input to a machine learning system. The machine learning system can then develop other signals found to be useful in setting thresholds for the contextually relevant additional queries and associated content blocks. In some implementations, signals are used alone or in combination to determine thresholds for contextually relevant additional queries and associated content blocks.

Figure 7:
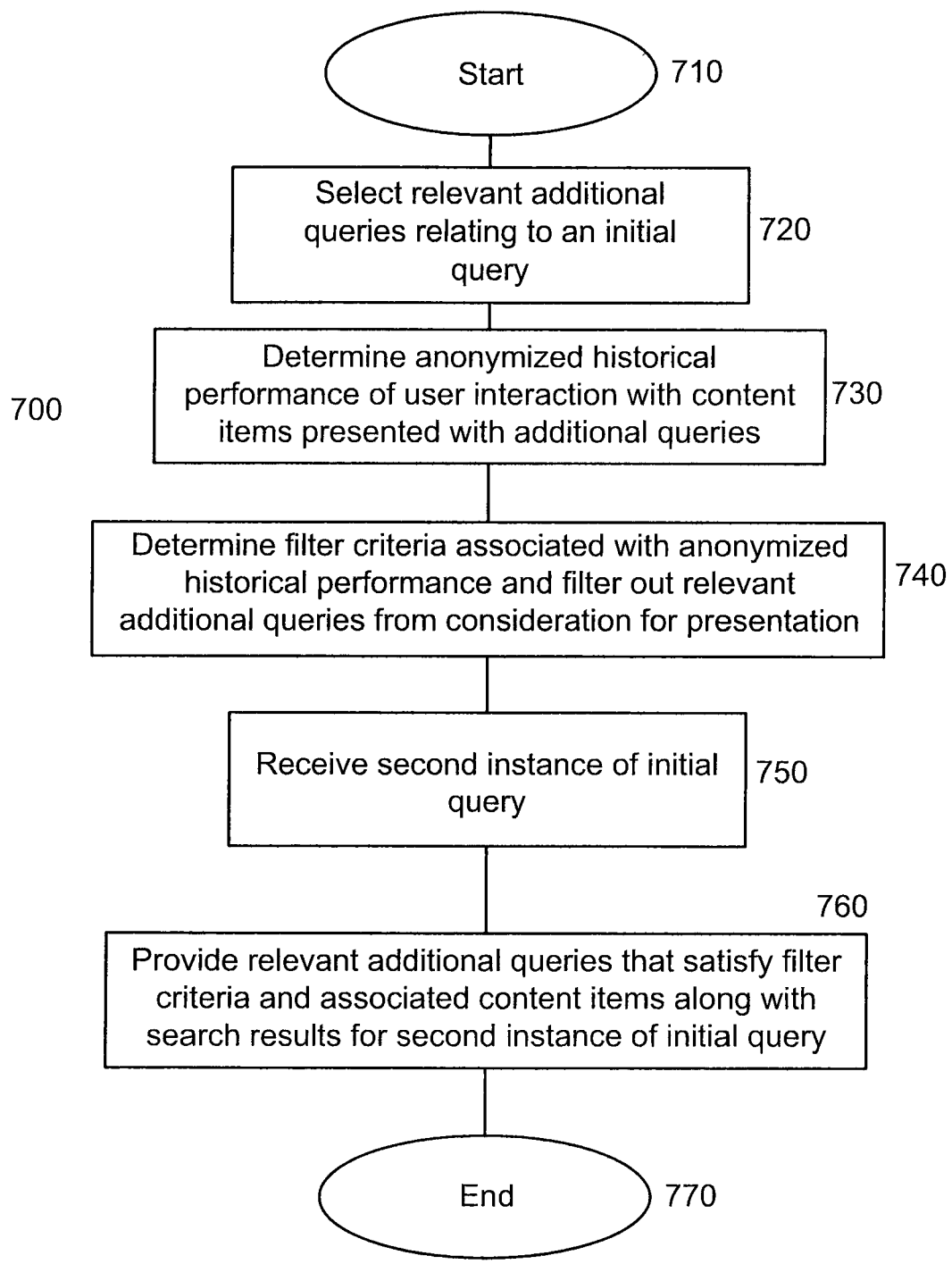
FIG. 7 is a flowchart of an example process for filtering additional queries and content items based on anonymized historical performance data.

FIG. 7 is a block diagram of an example method 700. Method 700 includes selecting relevant additional queries relating to an initial query, and determining anonymized historical performance of user interaction with content items presented with each of the relevant additional queries. Filter criteria associated with anonymized historical performance can be determined and may be used to filter out additional queries from consideration for presentation. A second instance of the initial query can be received, and relevant additional queries and associated content items can be provided, such as to a device for display to a user along with search results associated with the second instance of the initial query.

In more detail, at stage 720 relevant additional queries relating to an initial query are selected. For example, query reviser engine 107 can select one or more additional queries based on, for example, the relevance to the initial query. For example, in FIG. 3C, the query "childztoyz" 322 may be relevant to additional queries "childztoyz trading cards" 323A or "childztoyz pets" 323B. These additional queries are likely to be useful for a user searching for the initial query "childztoyz" 322.

At stage 730, anonymized historical performance of user interaction with content items is determined for content items when presented in a block that included a given additional query. For example, a user on a client device 102 may click on content block 139, causing search engine front end 105 to report to mixer engine 106 the performance indicator that a click occurred on the content block 139. This anonymized historical performance data can, for example, be a measure of the number of impressions of a content item or block, the click-through rate of a content item or block, a human evaluation of the relevance of the additional query to the initial query, or a measure of a loss in clicks associated with displaying an additional query that users did not find relevant or useful, or any combination of these or other historical performance indicators.

At stage 740, the filter criteria associated with the anonymized historical performance of user interaction are checked to filter out additional queries from consideration for presentation at a next receipt of the initial query. This filter criterion can, for example, be a minimum number of impressions, a minimum click-through rate, a minimum selection criteria as defined by human evaluators, or a maximum number of lost clicks due to displaying the content block associated with the relevant additional query. In some implementations, filtering can occur prior to additional content items being selected for a currently received query, hence speeding the processing of the currently received query. In some implementations, filtering can occur prior to running an auction to determine which content blocks and which content items are shown are provided responsive to a new initial query, hence speeding the processing of the currently received query.

At stage 750, a second instance of an initial query is received. This can, for example, be a second instance of an initial query 121 received at a search engine front end 105 for which anonymized historical performance data has already been measured.

At stage 760, relevant additional queries that satisfy the filter criteria, one or more content items associated with the relevant additional queries, and search results associated with the second instance of the initial query can be provided, such as to a device for display to a user. For example, in FIG. 3C, relevant additional queries 323A and 323B, content items 326B-D and 326E-F associated with the relevant additional queries, and search results 321 associated with a second instance of an initial query 322 are displayed. If the filter criteria are not satisfied, the relevant additional queries and associated content items are not displayed.

The filter criteria can, for example, be one or more of a measure of the number of impressions of a content item or block, the click-through rate of a content item or block, a human evaluation of the relevance of the additional query to the initial query, or a measure of the loss in clicks associated with displaying an additional query that users did not find relevant or useful, or any combination of these or other filter criteria. Other criteria are possible.

Signals can be used to determine whether a filter criterion for a relevant additional query and its associated content block is satisfied. If the filter criterion is satisfied, the additional query and associated content block can be displayed.

Signals used can be those as set forth above with respect to FIG. 4. Signals may be human-generated, machine-generated, or a combination of both. Human-generated signals, for example, can be input to a machine learning system. The machine learning system can then develop other signals found to be useful in setting thresholds for the contextually relevant additional queries and associated content blocks. In some implementations, signals are used alone or in combination to determine thresholds for contextually relevant additional queries and associated content blocks.

Figure 8:
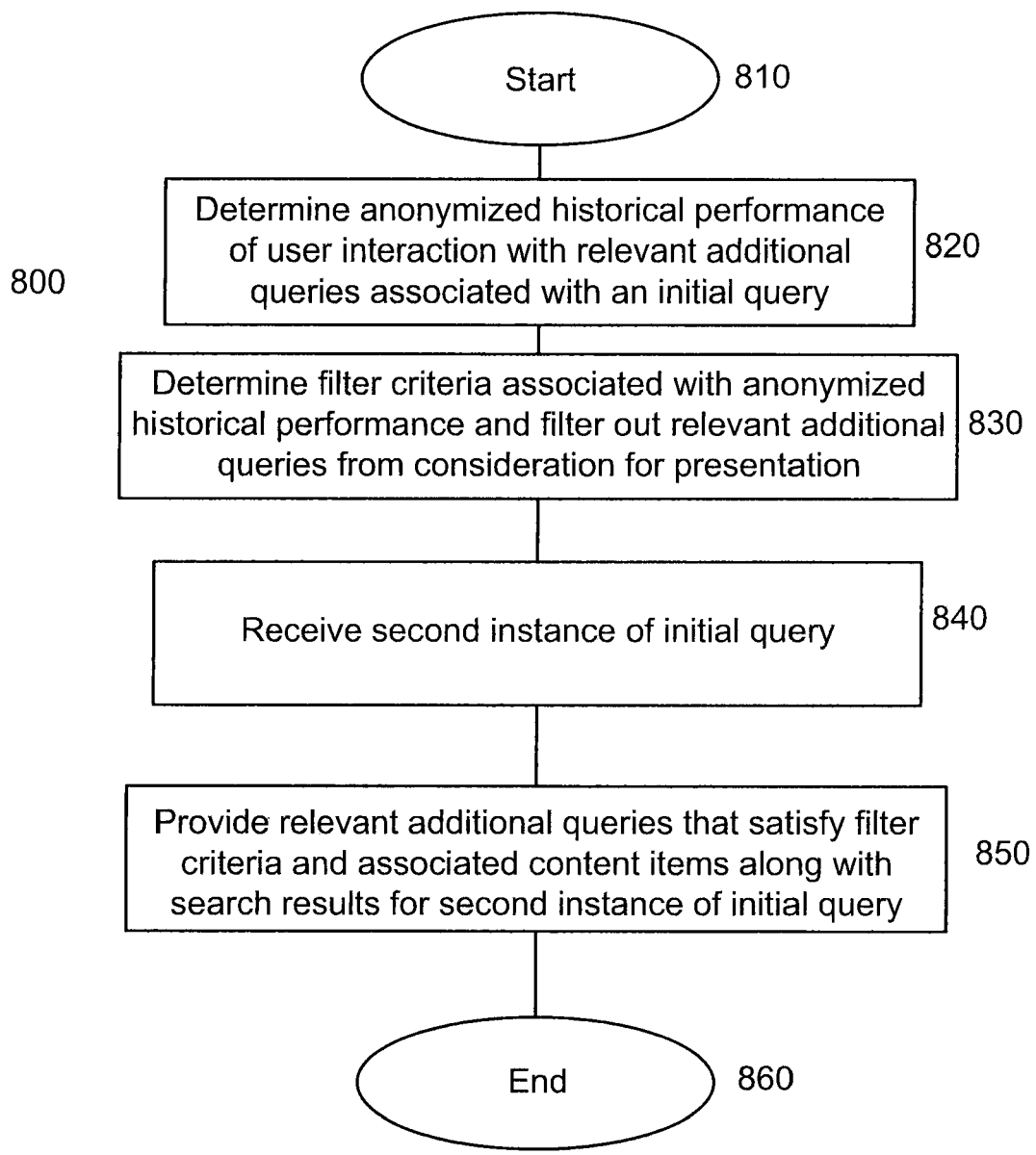
FIG. 8 is a flowchart of an example process for filtering additional queries and content items based on anonymized historical performance data.

FIG. 8 is a block diagram of an example method 800. Method 800 includes determining anonymized historical performance of user interaction with relevant additional queries associated with an initial query. Filter criteria associated with anonymized historical performance can be determined and may be used to filter out additional queries from consideration for presentation. A second instance of the initial query can be received, and relevant additional queries and associated content items can be provided, such as to a device for display to a user along with search results associated with the second instance of the initial query.

In more detail, at stage 820, anonymized historical performance of user interaction with relevant additional queries is determined. For example, a user on a client device 102 may click on content block 139 or on a presentation of a suggested query, causing search engine front end 105 to report to mixer engine 106 the performance indicator that a click occurred on the content block 139 or suggested query. This anonymized historical performance data can, for example, be a measure of the number of impressions of a content item or block, the click-through rate of a content item or block, a human evaluation of the relevance of the additional query to the initial query, or a measure of a loss in clicks associated with displaying an additional query that users did not find relevant or useful, or any combination of these or other historical performance indicators.

At stage 830, filter criteria associated with the anonymized historical performance of user interaction are determined and relevant additional queries are filtered out from consideration for presentation at a next receipt of an initial query. This filter criteria can, for example, be a minimum number of impressions, a minimum click-through rate, a minimum selection criterion as defined by human evaluators, or a maximum number of lost clicks due to displaying the content block associated with the relevant additional query.

At stage 840, a second instance of the initial query is received. This can, for example, be a second instance of an initial query 121 received at a search engine front end 105 for which anonymized historical performance data has already been measured.

At stage 850, relevant additional queries that satisfy the filter criteria, one or more content items associated with the relevant additional queries, and search results associated with the second instance of the initial query can be provided, such as to a device for display to a user. For example, in FIG. 3C, relevant additional queries 323A and 323B, content items 326B-D and 326E-F associated with the relevant additional queries, and search results 321 associated with a second instance of an initial query 322 are displayed. If the filter criteria are not satisfied, the relevant additional queries and associated content items are not displayed.

Signals can be used to determine whether a filter criterion for a relevant additional query and its associated content block is satisfied. If the filter criterion is satisfied, the additional query and associated content block can be displayed.

Signals used can be those as set forth above with respect to FIG. 4. Signals may be human-generated, machine-generated, or a combination of both. Human-generated signals, for example, can be input to a machine learning system. The machine learning system can then develop other signals found to be useful in setting thresholds for the contextually relevant additional queries and associated content blocks. In some implementations, signals are used alone or in combination to determine thresholds for contextually relevant additional queries and associated content blocks.

Figure 9:
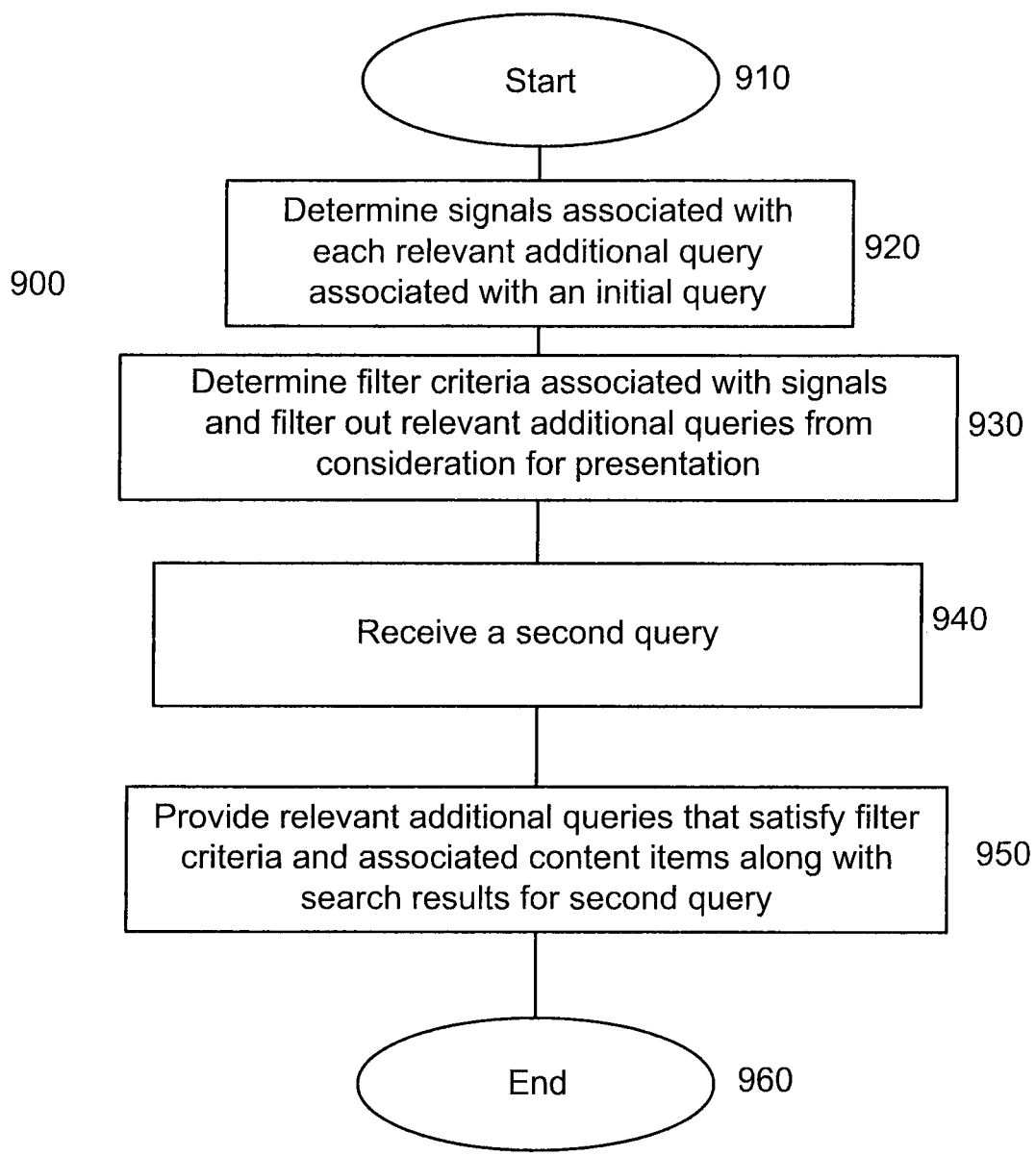
FIG. 9 is a flowchart of an example process for filtering additional queries and content items based on a filter criterion.

FIG. 9 is a block diagram of an example method 900. Method 900 includes determining signals associated with each relevant additional query that themselves are associated with an instance of an initial query. Filter criteria associated with the signals are determined and can be used to filter out additional queries from consideration for presentation at a next receipt of another query. A second query can be received, and relevant additional queries that satisfy the filter criteria and content items associated with the relevant additional queries can be provided, such as to a device for display to a user, along with search results associated with the second query In more detail, at stage 920, signals associated with each relevant additional query associated with an initial query are determined. For example, a user on a client device 102 may select or otherwise indicate an interest in a query suggestion provided to the user or otherwise interact with other content that is provided along with a particular query suggestion. The selection or other interaction can cause search engine front end 105 to report to mixer engine 106 the performance indicator that a click occurred on or a user otherwise interacted with the query suggestion. These signals can, for example, be a measure of the number of impressions of a query suggestion or content block associated therewith, the click-through rate of a suggestion, content item or block, a human evaluation of the relevance of the additional query to the initial query, or a measure of a loss in clicks associated with displaying an additional query that users did not find relevant or useful, or any combination of these or other historical performance indicators.

The signals in stage 920 may also be used to determine a filter criterion for additional queries and their associated content blocks. These signals can be used to determine whether an additional query and associated content block satisfies a filter criterion.

Signals can be those as set forth with respect to FIG. 4. Signals may be human-generated, machine-generated, or a combination of both. Human-generated signals, for example, can be input to a machine learning system. The machine learning system can then develop other signals found to be useful in setting thresholds for the additional queries and associated content blocks. In some implementations, signals are used alone or in combination to determine thresholds for additional queries and associated content blocks.

At stage 930, filter criteria associated with signals is determined, and relevant additional queries are filtered out from consideration for presentation at the receipt of another query. The filter criteria can, for example, be a minimum number of impressions, a minimum click-through rate, a minimum selection criterion as defined by human evaluators, or a maximum number of lost clicks due to displaying the content block associated with the relevant additional query. This filter criterion can also be human-generated or machine-generated signals or a combination of both. The filter criteria can also, for example, be signals indicative of additional queries that are likely to be of no or most interest to the user. The signals can be those as set forth above with respect to FIG. 4.

At stage 940, a second query is received. This can, for example, be a second query 121 received at a search engine front end 105. The second query and the initial query may or may not be the same query.

At stage 950, relevant additional queries that satisfy the filter criteria, one or more content items associated with the relevant additional queries, and search results associated with the second query are provided, such as to a device for display to a user. For example, in FIG. 3C, relevant additional queries 323A and 323B, content items 326B-D and 326E-F associated with the relevant additional queries, and search results 321 associated with a second instance of an initial query 322 are displayed. If the filter criteria are not satisfied, the relevant additional queries and associated content items are not displayed.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode data for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
    selecting one or more additional queries related to an instance of an initial query;
    determining anonymized historical performance in terms of user interaction with each of one or more respective content blocks for the one or more additional queries, wherein a content block for an additional query includes the additional query and one or more content items for the additional query;
    determining that one or more filter criteria associated with the anonymized historical performance of a content block for particular additional query does not satisfy a threshold;
    in response to determining that one or more filter criteria associated with the anonymized historical performance of a content block for the particular additional query does not satisfy a threshold, filtering out the particular additional query from consideration for presentation at a next receipt of the initial query;
    receiving a second instance of the initial query; and
    providing one or more additional queries having anonymized historical performance that satisfy the filter criteria, one or more respective content blocks associated with the one or more additional queries, and search results associated with the second instance of the initial query.

2. The method of claim 1, wherein the anonymized historical performance for an additional query is a measure of a loss in user selections when providing the additional query for the initial query.

3. A system comprising:
    one or more computers and one or more storage devices storing instructions that are operable, when executed by the one or more computers, to cause the one or more computers to perform operations comprising:
    selecting one or more additional queries related to an instance of an initial query;
    determining anonymized historical performance in terms of user interaction with each of one or more respective content blocks for the one or more additional queries, wherein a content block for an additional query includes the additional query and one or more content items for the additional query;
    determining that one or more filter criteria associated with the anonymized historical performance of a content block for particular additional query does not satisfy a threshold
    in response to determining that one or more filter criteria associated with the anonymized historical performance for the particular additional query does not satisfy a threshold, filtering out the particular additional query from consideration for presentation at a next receipt of the initial query;
    receiving a second instance of the initial query; and
    providing one or more additional queries having anonymized historical performance that satisfy the filter criteria, one or more respective content blocks associated with the one or more additional queries, and search results associated with the second instance of the initial query.

4. A computer program product, encoded on one or more non-transitory computer storage media, comprising instructions that when executed by one or more computers cause the one or more computers to perform operations comprising:

selecting one or more additional queries relating to an instance of an initial query;

determining anonymized historical performance in terms of user interaction with each of one or more respective content blocks for the one or more additional queries, wherein a content block for an additional query includes the additional query and one or more content items for the additional query;

determining that one or more filter criteria associated with the anonymized historical performance of a content block for particular additional query does not satisfy a threshold in response to determining that one or more filter criteria associated with the anonymized historical performance for the particular additional query does not satisfy a threshold, filtering out the particular additional query from consideration for presentation at a next receipt of the initial query;

receiving a second instance of the initial query; and providing one or more additional queries having anonymized historical performance that satisfy the filter criteria, one or more respective content blocks associated with the one or more additional queries, and search results associated with the second instance of the initial query.

* * * * *